US010754446B2

(12) United States Patent
Touyama et al.

(10) Patent No.: US 10,754,446 B2
(45) Date of Patent: Aug. 25, 2020

(54) INFORMATION PROCESSING APPARATUS AND INFORMATION PROCESSING METHOD

(71) Applicant: SONY CORPORATION, Tokyo (JP)

(72) Inventors: Keisuke Touyama, Tokyo (JP); Kae Nagano, Tokyo (JP); Tomohiro Ishii, Tokyo (JP); Kozue Sasaki, Tokyo (JP); Kazuhiro Toma, Kanagawa (JP); Nobuaki Kawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 131 days.

(21) Appl. No.: 15/758,240

(22) PCT Filed: Jun. 20, 2016

(86) PCT No.: PCT/JP2016/068199
§ 371 (c)(1),
(2) Date: Mar. 7, 2018

(87) PCT Pub. No.: WO2017/051571
PCT Pub. Date: Mar. 30, 2017

(65) Prior Publication Data
US 2018/0260044 A1    Sep. 13, 2018

(30) Foreign Application Priority Data
Sep. 25, 2015  (JP) ................. 2015-187833

(51) Int. Cl.
*G06F 3/0354*  (2013.01)
*G06F 3/0362*  (2013.01)
(Continued)

(52) U.S. Cl.
CPC ........ *G06F 3/03545* (2013.01); *G06F 3/0308* (2013.01); *G06F 3/0362* (2013.01);
(Continued)

(58) Field of Classification Search
CPC .. G06F 3/03545; G06F 3/0362; G06F 3/0481;
G06F 3/0484
See application file for complete search history.

(56) References Cited

U.S. PATENT DOCUMENTS

2013/0088465 A1* 4/2013 Geller ................ G06F 3/03545
345/179
2013/0106731 A1* 5/2013 Yilmaz ................ G06F 3/0346
345/173
(Continued)

FOREIGN PATENT DOCUMENTS

JP    2011-159091 A    8/2011
JP    2013-242821 A    12/2013
KR    10-2014-0128818 A    11/2014

OTHER PUBLICATIONS

International Search Report and Written Opinion of PCT Application No. PCT/JP2016/068199, dated Aug. 9, 2016, 07 pages.

*Primary Examiner* — Lixi C Simpson
(74) *Attorney, Agent, or Firm* — Chip Law Group

(57) ABSTRACT

Provided are an information processing apparatus and an information processing method capable of executing processing on the basis of a rotation operation that allows a user to easily rotate an operating body. An information processing apparatus including a processing execution unit that executes predetermined processing on a basis of a result of detecting a rotation operation of moving an operation body to draw a track about a predetermined axis such that a second portion of the operating body, which is different from a first portion of the operating body that is determined to be in contact with or approaching an operation plane, has a larger rotation radius than a rotation radius of the first portion.

19 Claims, 26 Drawing Sheets

(51) Int. Cl.
*G06F 3/0481* (2013.01)
*G06F 3/0484* (2013.01)
*G06F 3/03* (2006.01)

(52) U.S. Cl.
CPC .......... *G06F 3/0481* (2013.01); *G06F 3/0484* (2013.01); *G06F 3/04847* (2013.01); *G06F 2203/0339* (2013.01); *G06F 2203/04806* (2013.01)

(56) References Cited

U.S. PATENT DOCUMENTS

| | | | | |
|---|---|---|---|---|
| 2013/0257777 | A1* | 10/2013 | Benko | G06F 3/03545 345/173 |
| 2014/0022218 | A1* | 1/2014 | Parekh | G06F 3/038 345/179 |
| 2014/0253521 | A1* | 9/2014 | Hicks | G06F 3/03545 345/179 |
| 2016/0139690 | A1* | 5/2016 | Chang | G06F 3/0383 345/179 |

* cited by examiner

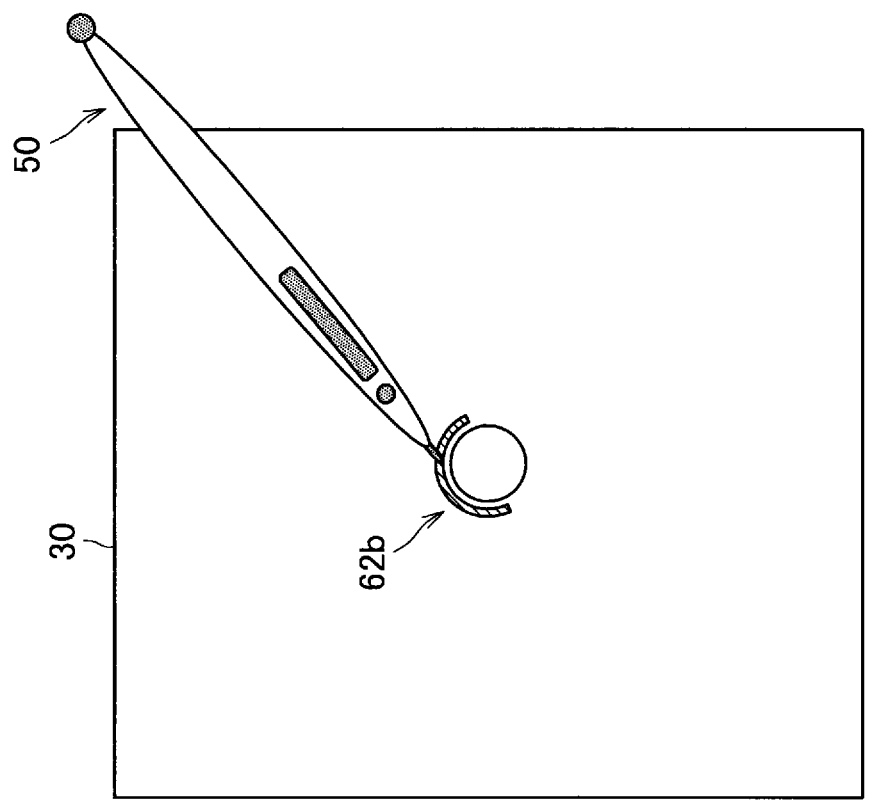
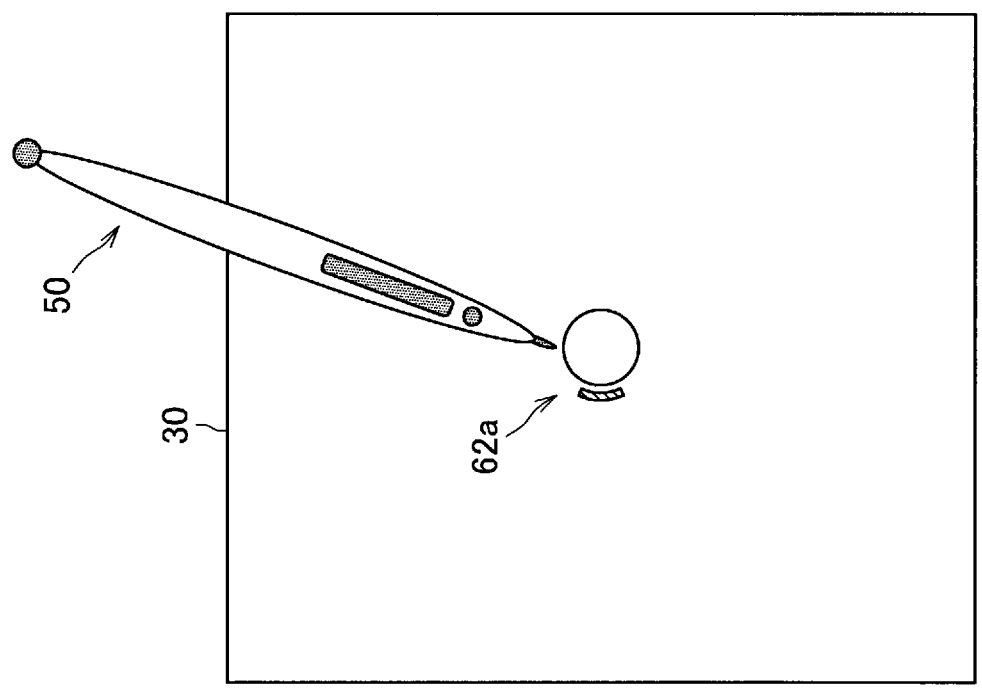
FIG. 20(B)

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/068199 filed on Jun. 20, 2016, which claims priority benefit of Japanese Patent Application No. JP 2015-187833 filed in the Japan Patent Office on Sep. 25, 2015. Each of the above-referenced applications is hereby incorporated herein by reference in its entirety.

TECHNICAL FIELD

The present disclosure relates to an information processing apparatus, an information processing method, and a program.

BACKGROUND ART

In the past, studies related to a graphical user interface (GUI) have been conducted for the purpose of enabling intuitive operations of an information processing apparatus such as a personal computer (PC), for example. With this GUI, a user selects an object such as an icon displayed on a display screen, for example, with a pointing device to enable a computer to execute processing corresponding to the selected object.

For example, Patent Literature 1 describes a technology of changing display content such as a display position and motion of the GUI on the basis of a result of determining a twisting motion of a pen axis of a pen type input device.

CITATION LIST

Patent Literature

Patent Literature 1: JP 2013-242821A

DISCLOSURE OF INVENTION

Technical Problem

However, according to the technology described in Patent Literature 1, it is difficult for the user to perform a rotation operation of the pen type input device. For example, according to the rotating operation described in Patent Literature 1, it is necessary for the user to rotate the pen type input device about the axis of the pen type input device. Therefore, it is difficult for the user to rotate the pen type input device 360 degrees or more without changing her or his grip on the pen type input device, for example.

Thus, the present disclosure will propose a novel and improved information processing apparatus, information processing method, and program capable of executing processing on the basis of a rotation operation that allows a user to easily rotate an operating body.

Solution to Problem

According to the present disclosure, there is provided an information processing apparatus including: a processing execution unit that executes predetermined processing on a basis of a result of detecting a rotation operation of moving an operation body to draw a track about a predetermined axis such that a second portion of the operating body, which is different from a first portion of the operating body that is determined to be in contact with or approaching an operation plane, has a larger rotation radius than a rotation radius of the first portion.

In addition, according to the present disclosure, there is provided an information processing method including: executing, by a processor, predetermined processing on a basis of a result of detecting a rotation operation of moving an operation body to draw a track about a predetermined axis such that a second portion of the operating body, which is different from a first portion of the operating body that is determined to be in contact with or approaching an operation plane, has a larger rotation radius than a rotation radius of the first portion.

In addition, according to the present disclosure, there is provided a program that causes a computer to function as: a processing execution unit that executes predetermined processing on a basis of a result of detecting a rotation operation of moving an operation body to draw a track about a predetermined axis such that a second portion of the operating body, which is different from a first portion of the operating body that is determined to be in contact with or approaching an operation plane, has a larger rotation radius than a rotation radius of the first portion.

Advantageous Effects of Invention

According to the present disclosure, it is possible to execute processing on the basis of a rotation operation that allows the user to easily rotate the operating body as described above. Note that the effect described here is not necessarily limiting, and any effects described in the present disclosure may be achieved.

BRIEF DESCRIPTION OF DRAWINGS

FIGS. 20(A) and 20(B) are explanatory diagrams illustrating an example of an updated display form of display in the rotation operation mode depending on a change in the second parameter value according to the second embodiment.

MODE(S) FOR CARRYING OUT THE INVENTION

Figure 1:
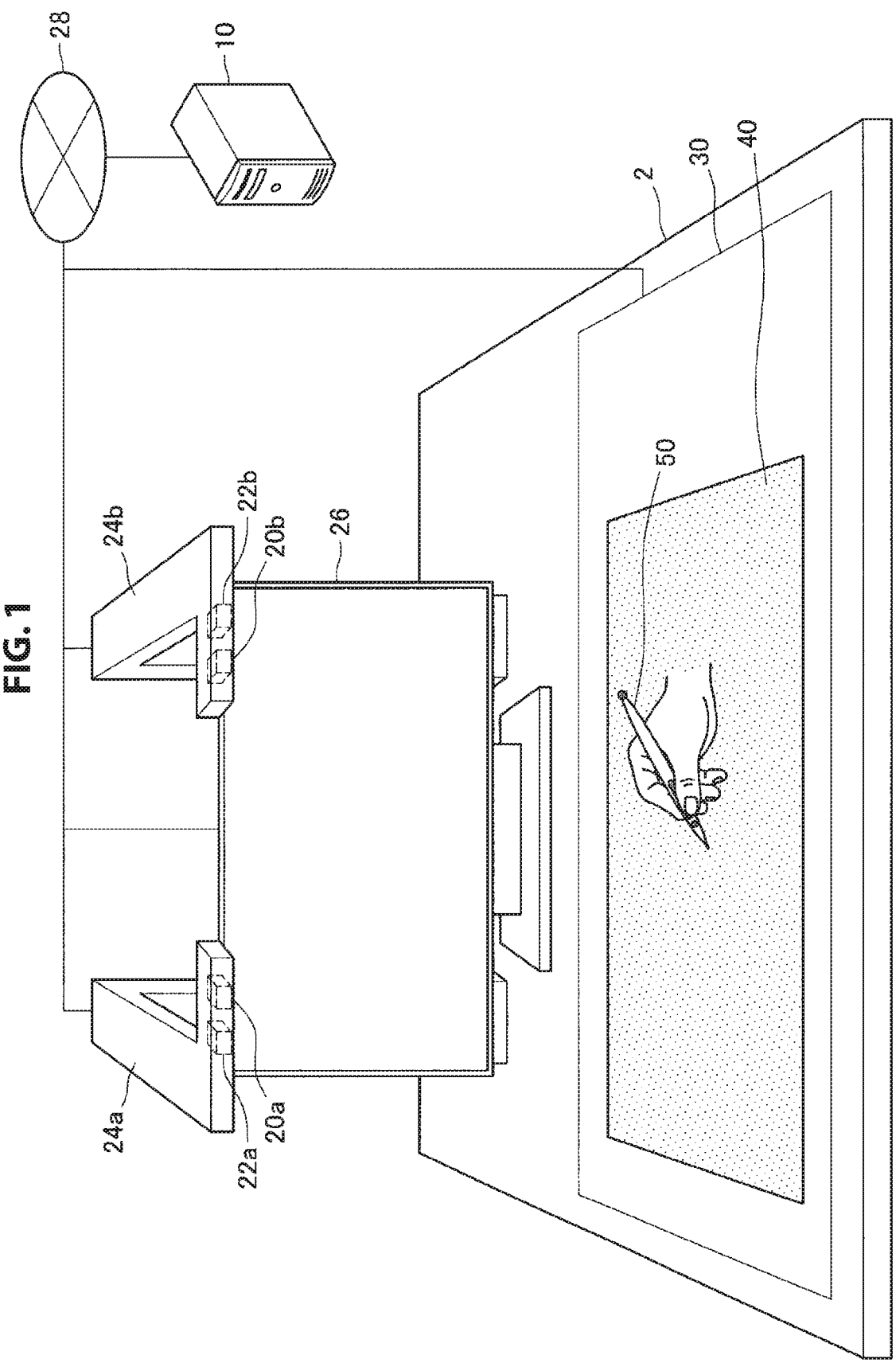
FIG. 1 is an explanatory diagram illustrating a configuration example of an information processing system that is common to respective embodiments of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, there are also cases in which a plurality of structural elements that have substantially the same function and structure are distinguished by applying different alphabets after the same reference numerals in the specification and the drawings. For example, a plurality of components that have substantially the same function and structure are distinguished as a display unit 20a and a display unit 20b as needed. However, only the same reference numerals are applied in a case in which it is not particularly necessary to distinguish the plurality of respective structural elements that have substantially the same function and structure. For example, the display unit 20a and the display unit 20a are simply referred to as a display unit 20 in a case in which it is not particularly necessary to distinguish them.

In addition, the "modes for carrying out the invention" will be described in the order of items described below.
1. Basic configuration of information processing system
2. Detailed description of embodiments
3. Hardware configuration
4. Modification examples Note that there are cases in which a server 10-1 according to a first embodiment and a server 10-2 according to a second embodiment will be collectively referred to as a server 10 in the specification and the drawings.

1. BASIC CONFIGURATION OF INFORMATION PROCESSING SYSTEM

1-1. Basic Configuration

The present disclosure can be carried out in various forms as will be described in detail in "2-1. First embodiment" to "2-2. Second embodiment" as examples. First, a basic configuration of an information processing system that is common to the respective embodiments will be described with reference to FIG. 1.

As illustrated in FIG. 1, the information processing system that is common to the respective embodiments includes the server 10, the display unit 20, a camera 22, a display device 26, an operation plane 30, and a pen type input device 50.

[1-1-1. Server 10]

The server 10 is an example of the information processing apparatus according to the present disclosure. The server 10 is a device that controls the operation of the display unit 20, the camera 22, the display device 26, the operation plane 30, or the pen type input device 50, for example. In addition, the server 10 can transmit and receive information to and from the display unit 20, the camera 22, the display device 26, the operation plane 30, or the pen type input device 50 via a communication network 28, which will be described later.

[1-1-2. Display Unit 20]

The display unit 20 is a device that displays image information received from the server 10, for example. As illustrated in FIG. 1, for example, the display unit 20 is a projector that is installed on an arm unit 24, and the display unit 20 projects image information 40 such as an application screen, for example, on the operation plane 30. Note that the arm unit 24 may be arranged on a desk 2 independently from the display device 26, which will be described later, or may be coupled to the display device 26.

In addition, the display unit 20 can also change a direction of display (projection) in accordance with a control signal that is received from the server 10.

Figure 2:
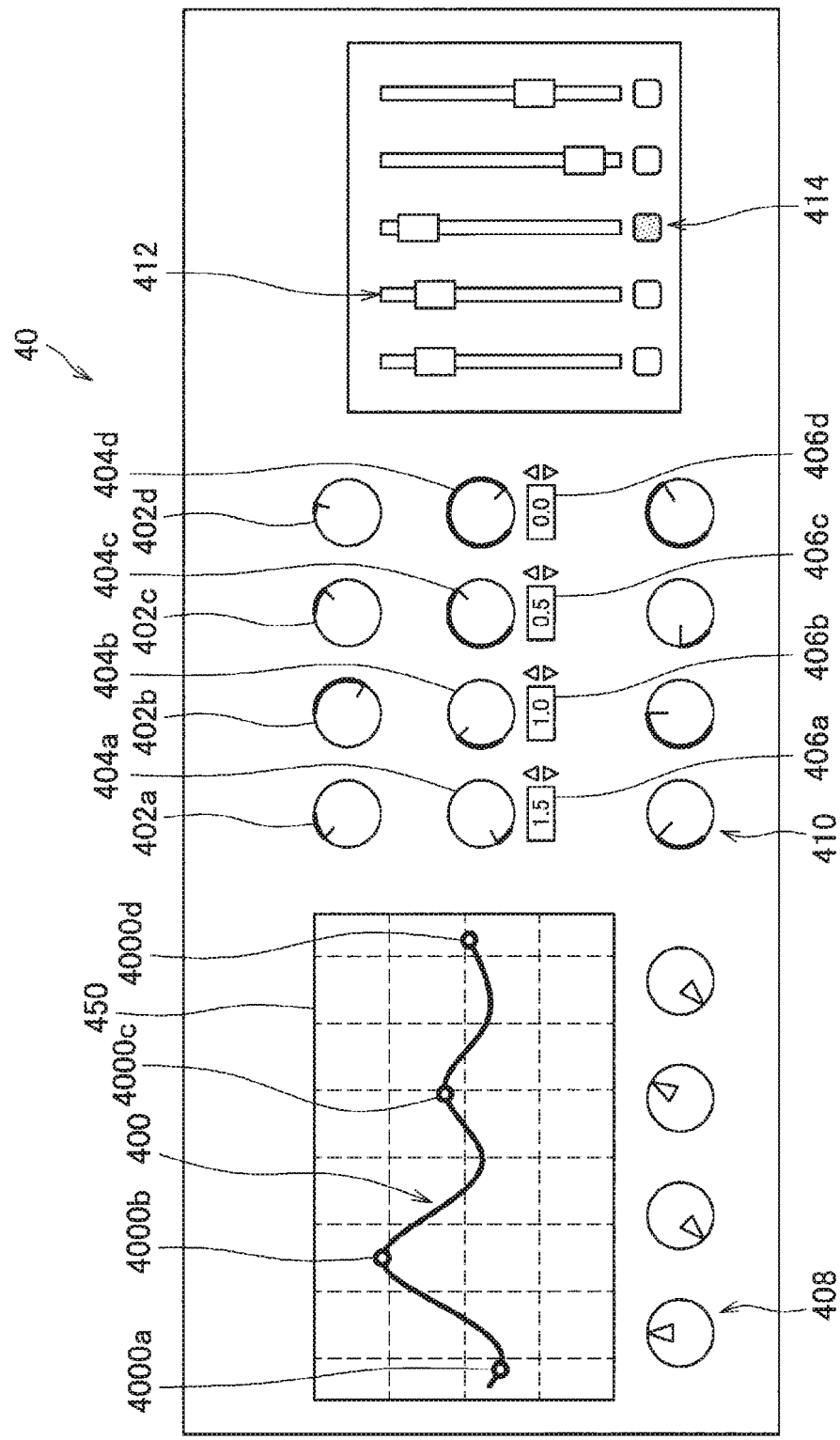
FIG. 2 is an explanatory diagram illustrating a display example of an application screen.

Here, a display example of an application screen (application screen 40) that is displayed on the operation plane 30 will be described with reference to FIG. 2. The application screen 40 is a control screen for a software sound source plugin that is included in a digital audio workstation (DAW), for example. As illustrated in FIG. 2, the application screen 40 includes a coordinate plane 450, a gain setting dial 402, a frequency setting dial 404, a spin control 406, an effector setting dial 408, an effector setting dial 410, a slider GUI 412, a function selecting button GUI 414, and the like, for example.

Here, the coordinate plane 450 is a coordinate plane that has a vertical axis corresponding to a gain and a horizontal axis corresponding to a frequency, for example. In addition, a graph 400 indicating frequency properties of an equalizer is displayed on the coordinate plane 450 as illustrated in FIG. 2. This graph 400 is a graph that is decided by coordinates of four points 4000. In addition, the gain setting dial 402 is a dial GUI for setting gains of the respective points 4000. In addition, the frequency setting dial 404 is a dial GUI for setting frequencies of the respective points 4000. In addition, the spin control 406 is a GUI for setting Q values of the respective points 4000. Also, the effector setting dial 408 and the effector setting dial 410 are GUIs for setting effectors other than the equalizer. Note that the effector setting dial 408 is a GUI for setting an effector that takes discrete values, and the effector setting dial 410 is a GUI for setting an effector that takes continuous values. In addition, the slider GUI 412 is a GUI for setting gains of other types of parameters. In addition, the function selecting button GUI 414 is a GUI for setting ON/OFF of a predetermined function. The user can control various types of information such as sound quality, sound volume, or effectors, for example, by operating the aforementioned various GUIs on this application screen 40.

[1-1-3. Camera 22]

The camera 22 records an external image as a digital image by detecting the external image using an imaging element, such as a charge coupled device (CCD) or a complementary metal oxide semiconductor (CMOS), for example, or an infrared ray sensor through a lens.

This camera 22 is installed on the arm unit 24, for example, and captures an image on the operation plane 30.

[1-1-4. Operation Plane 30]

The operation plane 30 is a plane on which the user performs an input operation using the pen type input device 50, which will be described later, or the like, for example. For example, the operation plane 30 can detect coordinates of a position that is touched by the user with the pen type input device 50 in a coordinate system set on the operation plane 30.

In addition, the operation plane 30 can also transmit the detected information to the server 10 via the communication network 28 through wired communication or wireless communication.

This operation plane 30 is a pressure sensitive sheet that is arranged on the desk 2, for example. However, the operation plane 30 is not limited to such an example and may be a pressure sensitive type touch pad or a touch panel. For example, the operation plane 30 may be a touch display. Note that, although FIG. 1 illustrates an example in which the operation plane 30 is independent from the desk 2, the operation plane 30 is not limited to such an example and may be integrated with the desk 2.

[1-1-5. Pen Type Input Device 50]

Figure 3:
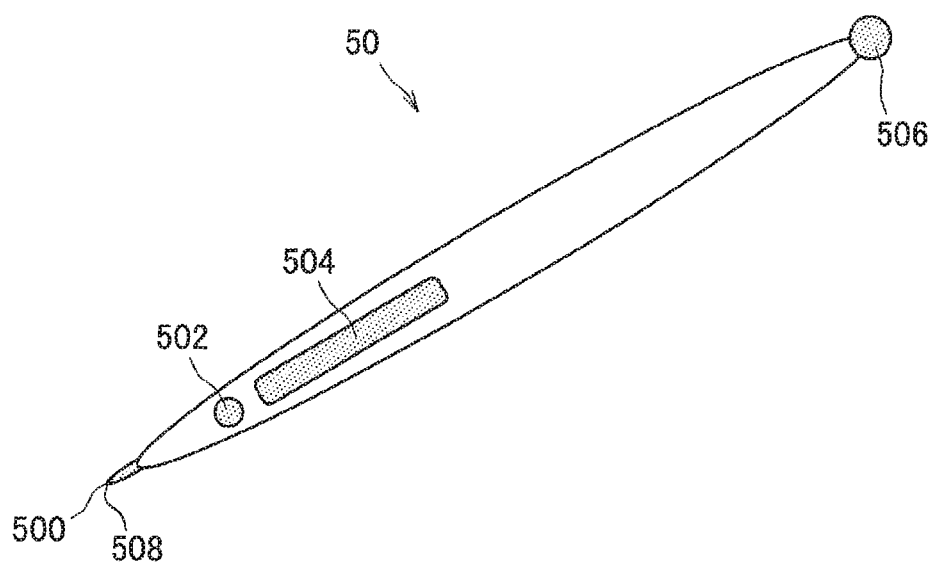
FIG. 3 is an explanatory diagram illustrating an example of an appearance of a pen type input device 50 that is common to the respective embodiments.

The pen type input device 50 is an example of the operating body according to the present disclosure. The pen type input device 50 is an input device with which the user performs an input on an application, for example, in a state in which the user holds the pen type input device 50 with one hand. FIG. 3 is an explanatory diagram illustrating an example of an appearance of the pen type input device 50. As illustrated in FIG. 3, the pen type input device 50 includes a pen tip pressure sensitive sensor 500, a button 502, and a slider 504, for example. Moreover, the pen type input device 50 includes an invisible light emitting body 508 that is installed on the pen tip of the pen type input device 50, and an invisible light emitting body 506 that is installed on the tail end of the pen type input device 50, for example. These invisible light emitting body 506 and invisible light emitting body 508 emit infrared rays, for example. Note that the emitted infrared rays can be imaged by the camera 22.

Moreover, the pen type input device 50 may have a gravity sensor (not illustrated), a gyroscope (not illustrated), and the like built therein.

In addition, the pen type input device 50 can also transmit operation information indicating an operation result of the pen type input device 50 to the server 10 via the communication network 28 through wired communication or wireless communication. Here, the operation information includes detection information detected by the pen tip pressure sensitive sensor 500, the gravity sensor, or the gyroscope, information related to the user's input to the button 502 or the slider 504, and the like, for example.

[1-1-6. Display Device 26]

The display device 26 is a device that includes a display such as a liquid crystal display (LCD) or an organic light emitting diode (OLED), for example. This display device 26 is a device with a display such as a monitor for a desktop personal computer (PC), for example, which is directed in the horizontal direction. However, the display device 26 is not limited to such an example and may be a table plate type device or a rear projection type display that performs projection with a built-in projector from a back surface of a screen.

For example, the display device 26 displays image information of the application screen or the like that is received from the server 10.

[1-1-7. Communication Network 28]

The communication network 28 is a wired or wireless transmission path of information that is transmitted from a device connected to the communication network 28. For example, the communication network 28 may include public line networks such as a phone line network, the Internet, and a satellite communication network, various local area networks (LANs) including Ethernet (registered trademark), wide area networks (WANs), and the like. In addition, the communication network 28 may include dedicated line networks such as an Internet protocol-virtual private network (IP-VPN).

Note that the configuration of the information processing system that is common to the respective embodiments is not limited to the aforementioned configuration. For example, the display unit 20 and the operation plane 30 may be integrated like a touch display, for example. In addition, although FIG. 1 illustrates an example in which the display unit 20 and the camera 22 are provided together at the arm unit 24, the display unit 20 and the camera 22 are not limited to such an example and may be arranged on the desk 2 in an independent state. In addition, although FIG. 1 illustrates the example in which two display units 20 and two cameras 22 are provided at the arm 24, the configuration is not limited to such an example. One display unit 20 or camera 22 alone may be provided, or three or more display units 20 or cameras 22 may be provided. In addition, the information processing system may not include the display device 26.

1-2. Summary of Problems

The configuration of the information processing system that is common to the respective embodiments has been described above. Incidentally, a mouse has widely been utilized for performing operations of an application conventionally. However, since the number of orders of information that can be input at the same time is small in the case of input using a mouse, it takes a long time to perform the operations. Since a mouse can typically decide values only one by one, for example, the operations are inefficient in relation to a GUI that does not achieve a result until a plurality of values are decided.

In addition, the operations of input using a mouse are performed by the same methods such as operations using clicking and dragging, for example, regardless of the type of the GUI. Therefore, intuitive operations cannot be performed for some GUIs.

Thus, the server 10 according to the respective embodiments has been contrived in view of the aforementioned circumstances. According to the respective embodiments, the user can operate a plurality of functions of an application at the same time by performing operations using the pen type input device 50 on the operation plane 30. Hereinafter, the respective embodiments will be described in detail in order.

2. DETAILED DESCRIPTION OF EMBODIMENTS

2-1. First Embodiment

[2-1-1. Configuration]

Figure 4:
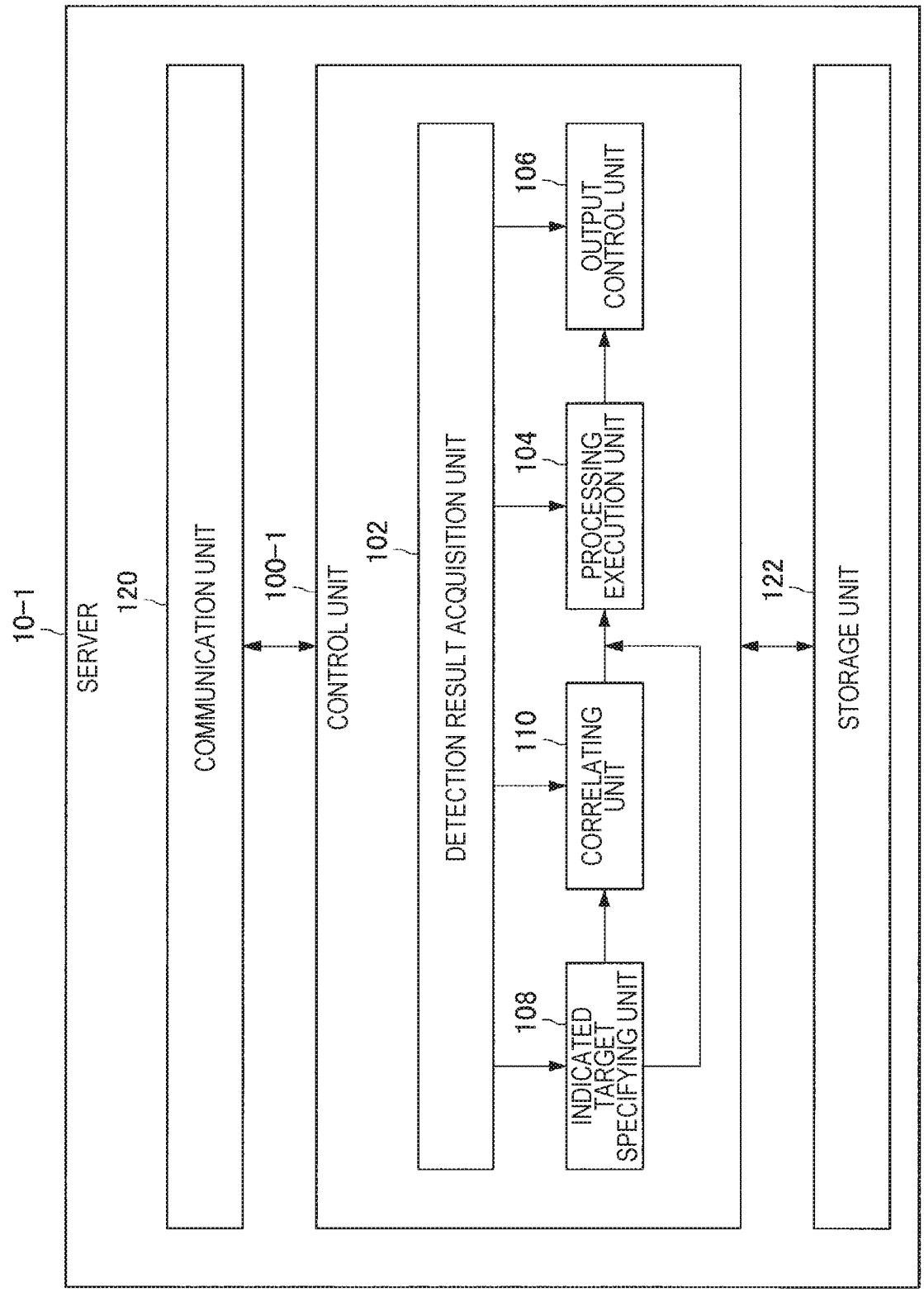
FIG. 4 is a functional block diagram illustrating a configuration example of a server 10-1 according to a first embodiment.

First, a configuration of the server 10-1 according to the first embodiment will be described in detail. FIG. 4 is a functional block diagram illustrating the configuration of the server 10-1 according to the first embodiment. As illustrated in FIG. 4, the server 10-1 includes a control unit 100-1, a communication unit 120, and a storage unit 122.

(2-1-1-1. Control Unit 100-1)

The control unit 100-1 controls the overall operation of the server 10-1 using hardware, which will be described later, such as a central processing unit (CPU) 150 and a random access memory (RAM) 154 that are built in the server 10-1. In addition, the control unit 100-1 includes a detection result acquisition unit 102, a processing execution unit 104, an output control unit 106, an indicated target specifying unit 108, and a correlating unit 110 as illustrated in FIG. 4.

(2-1-1-2. Detection Result Acquisition Unit 102)

The detection result acquisition unit 102 acquires a result of detecting a user's operation using the pen type input device 50. For example, the detection result acquisition unit 102 acquires, from the operation plane 30, a result of detecting a touch position of a pen tip of the pen type input device 50 on the operation plane 30. Alternatively, the detection result acquisition unit 102 can also specify the touch position of the pen tip by acquiring a captured image of the invisible light emitting body 508, for example, from the camera 22 and then performing image recognition on the acquired captured image.

In addition, the detection result acquisition unit 102 acquires, from the pen type input device 50, a result of detecting a user's operation on the button 502 or the slider 504, for example.

In addition, the detection result acquisition unit 102 specifies a rotation operation of the pen type input device 50 or an operation of inclining the pen type input device 50 by acquiring a detection result of the gravity sensor or the gyroscope from the pen type input device 50. Alternatively, the detection result acquisition unit 102 can also specify the rotation operation of the pen type input device 50 or the operation of inclining the pen type input device 50 by performing image recognition on a captured image of the invisible light emitting body 506, for example.

In addition, the detection result acquisition unit 102 can also specify a writing pressure of the pen type input device 50 by acquiring a detection result of the pen tip pressure sensitive sensor 500 from the pen type input device 50 or acquiring a result of detecting strength of force of the pen type input device 50 that touches the operation plane 30 from the operation plane 30.

(2-1-1-3. Processing Execution Unit 104)

The processing execution unit 104 executes predetermined processing on the basis of a detection result acquired by the detection result acquisition unit 102. For example, the processing execution unit 104 changes a value of a parameter correlated with a GUI that is being displayed on the operation plane 30 on the basis of the acquired detection result.

Figure 5:
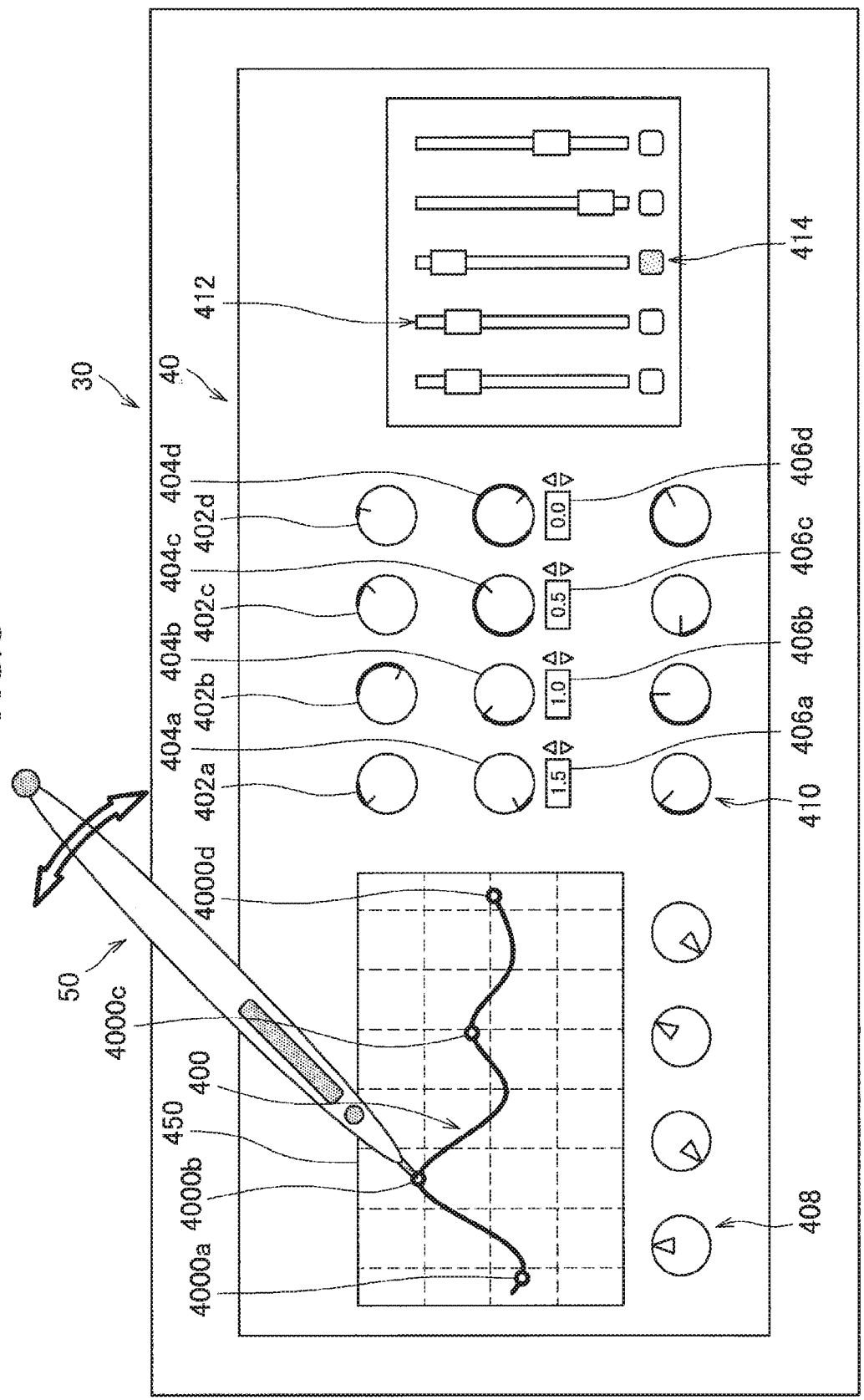
FIG. 5 is an explanatory diagram illustrating an operation example of an application screen that uses the pen type input device 50.

Here, the aforementioned function will be described in more detail with reference to FIG. 5. FIG. 5 is an explanatory diagram illustrating an example of an operation that is performed on the application screen 40 illustrated in FIG. 2 using the pen type input device 50.

In a case in which the pen tip of the pen type input device 50 is made to slide on the operation plane 30 in a state in which the pen tip of the pen type input device 50 is in contact with a display position of a point 4000b that is being displayed on the operation plane 30, for example, the processing execution unit 104 changes a gain and a frequency of the point 4000b to a value corresponding to a Y coordinate of the point 4000b or a value corresponding to an X coordinate on the coordinate plane 450 after the sliding. This allows the user to change the value of the gain as a parameter correlated with the gain setting dial 402b and the value of the frequency as a parameter correlated with the frequency setting dial 404b at the same time.

Further, the processing execution unit 104 changes the Q value of the point 4000b to a value corresponding to an amount of the operation of the slider 504 by the user operating the slider 504 in the state in which the pen tip of the pen type input device 50 is in contact with the display position of the point 4000b. Note that a display value of the spin control 406b is also changed (from a value before the change) to the value of the Q value after the change at this time by the output control unit 106, which will be described later.

In addition, the processing execution unit 104 can also increase or decrease the value of the parameter correlated with the slider GUI 412 on the basis of the result of detecting the writing pressure (of the pen tip) of the pen type input device 50, which has been acquired by the detection result acquisition unit 102.

In addition, the processing execution unit 104 may increase or decrease a value of an effector of the effector setting dial 410, which is correlated in advance, on the basis of a direction and an amount of detected rotation of the pen type input device 50 in a case in which it is detected that the pen type input device 50 has been rotated in a state in which the pen tip of the pen type input device 50 is in contact with the operation plane 30.

In addition, the processing execution unit 104 can also switch the function selecting button GUI 414, which is correlated with the button 502 in advance, between ON and OFF in a case in which it is detected that the button 502 (of the pen type input device 50) has been pressed. Alternatively, the processing execution unit 104 may decide which of a plurality of effector setting dials 408 is to be correlated with the rotation operation of the pen type input device 50 depending on a result of detecting the number of times the button 502 has been pressed.

Further, the processing execution unit 104 may increase or decrease a value of an effector corresponding to the effector setting dial 408 correlated in advance depending on a result of detecting a degree of inclination of the pen type input device 50.

According to the control example as described above, the user can set values of three or more types of parameters at the same time by operating the pen type input device 50.

Modification Examples

Figure 6:
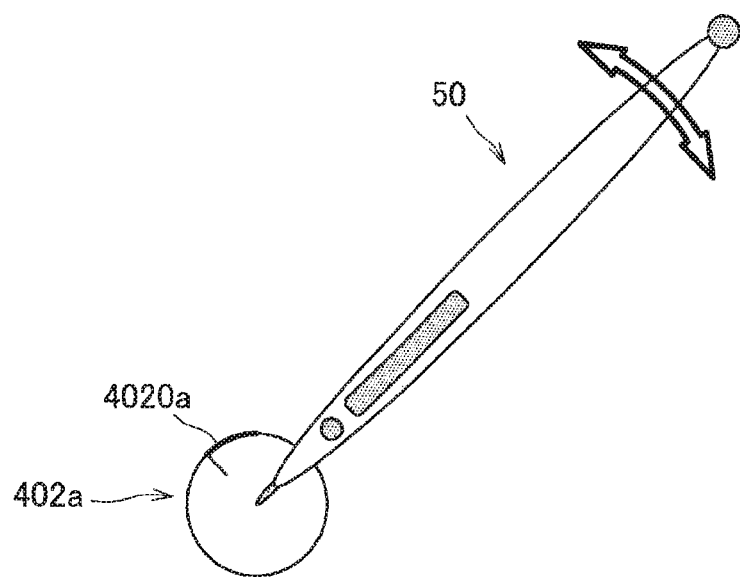
FIG. 6 is an explanatory diagram illustrating an operation example of a dial type GUI that uses the pen type input device 50.

Note that the processing execution unit 104 can also change a value of one type of a parameter alone on the basis of the detection result acquired by the detection result acquisition unit 102 in a modification example. Here, the function described above will be described in more detail with reference to FIGS. 6 and 7. FIG. 6 is an explanatory diagram illustrating an example of an operation of a gain setting dial 402*a* using the pen type input device 50. In a case in which it is detected that a rotation memory unit 4020*a* included in the gain setting dial 402*a* has been touched by the pen tip of the pen type input device 50 and that the pen tip has been made to slide to draw a circle, for example, the processing execution unit 104 may change a value of a parameter alone correlated with the gain setting dial 402*a* on the basis of the amount of the detected movement of the pen tip. Alternatively, in a case in which it is detected that the gain setting dial 402*a* has been touched by the pen tip of the pen type input device 50 and that the pen type input device 50 itself has been rotated as illustrated in FIG. 6, the processing execution unit 104 may change the value of the parameter alone correlated with the gain setting dial 402*a* on the basis of the direction and the amount of the detected rotation of the pen type input device 50.

Figure 7:
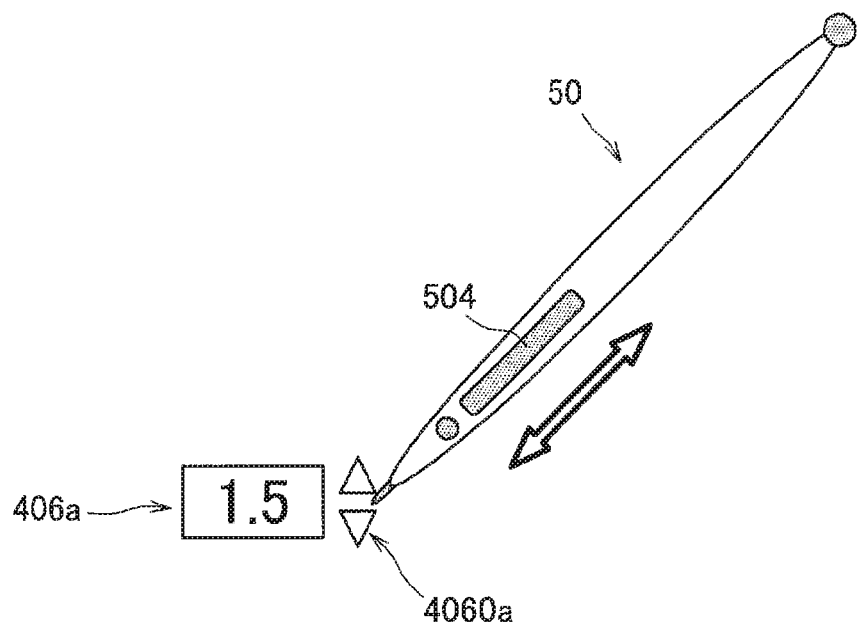
FIG. 7 is an explanatory diagram illustrating an operation example of a spin control type GUI that uses the pen type input device 50.

In addition, FIG. 7 is an explanatory diagram illustrating an example of an operation of a spin control 406*a* using the pen type input device 50. In a case in which a spin control unit 4060*a* included in the spin control 406*a* is touched by the pen tip of the pen type input device 50 once or more as illustrated in FIG. 7, for example, the processing execution unit 104 may change a value of a parameter alone correlated with the spin control 406*a* on the basis of a result of detecting the number of times the pen tip of the pen type input device 50 has touched. Alternatively, in a case in which it is detected that the user has operated the slider 504 in a state in which the spin control 406*a* is touched by the pen tip of the pen type input device 50, the processing execution unit 104 may increase or decrease the value of the parameter correlated with the spin control 406*a* on the basis of the amount of the detected operation of the slider 504.

(2-1-1-4. Output Control Unit 106)

Output Example 1

The output control unit 106 is an example of the display control unit according to the present disclosure. The output control unit 106 controls outputs of results of executing processing by the processing execution unit 104. For example, the output control unit 106 causes display of a GUI corresponding to a parameter to change on the basis of a change in the value of the parameter due to the processing execution unit 104. In the example of the application screen 40 illustrated in FIG. 5 as one example, the output control unit 106 causes the point 4000*b* to move to coordinates corresponding to the values of the gain and the frequency after the change and causes the graph 400 to be displayed with a shape changed in accordance with the movement of the point 4000*b* in a case in which the values of the gain and the frequency of the point 4000*b* are changed by the processing execution unit 104. Further, the output control unit 106 updates a display form of the gain setting dial 402*b* to correspond to the value of the gain after the change and updates the display form of the frequency setting dial 404*b* to correspond to the value of the frequency after the change.

Output Example 2

Figure 8:
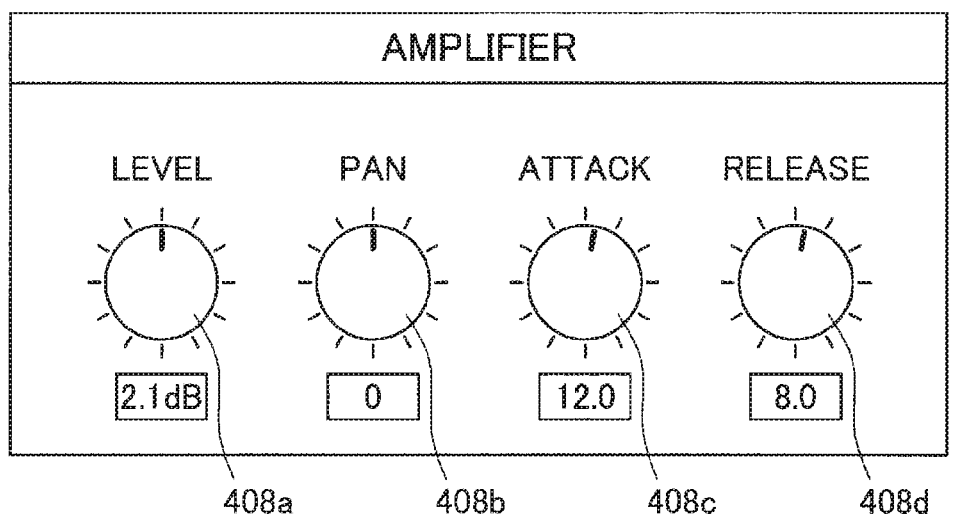
FIG. 8 is an explanatory diagram illustrating a display example of the dial type GUI.

In addition, the output control unit 106 can also cause the pen type input device 50 to vibrate on the basis of a change in a value of a parameter due to the processing execution unit 104. In a case in which a value of 'LEVEL' as a parameter corresponding to an effector setting dial 408*a* illustrated in FIG. 8 is successively changed by the processing execution unit 104, for example, the output control unit 106 may cause the pen type input device 50 to vibrate when the value of 'LEVEL' becomes "0 dB". Similarly, in a case in which a value of 'PAN' as a parameter corresponding to an effector setting dial 408*b* is successively changed by the processing execution unit 104, the output control unit 106 may cause the pen type input device 50 to vibrate when the value of 'PAN' becomes a value at the center position of the effector setting dial 408*b*. Similarly, in a case in which a value of 'ATTACK' as a parameter corresponding to an effector setting dial 408*c* is successively changed by the processing execution unit 104, the output control unit 106 may cause the pen type input device 50 to vibrate every time the value of 'PAN' becomes values at the individual scale positions of the effector setting dial 408*c*. Similarly, in a case in which a value of 'RELEASE' as a parameter corresponding to an effector setting dial 408*d* is successively changed by the processing execution unit 104, the output control unit 106 may cause the pen type input device 50 to vibrate when the value of "RELEASE" becomes a minimum value or a maximum value or when the value becomes a value at an initial position of the effector setting dial 408*d*. Alternatively, the output control unit 106 may also cause the pen type input device 50 to vibrate in a case in which the value of the parameter corresponding to each effector setting dial 408 is changed to a value outside a range set in advance.

Figure 9:
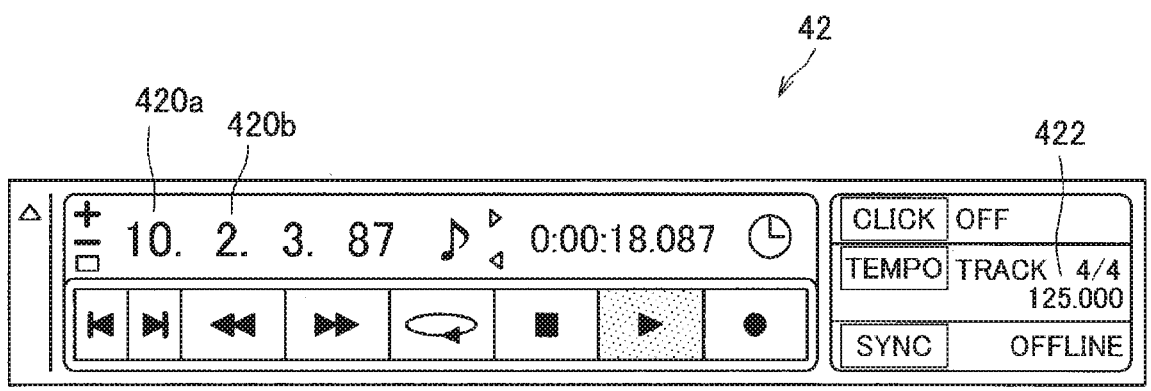
FIG. 9 is an explanatory diagram illustrating another display example of the application screen.

In addition, FIG. 9 is an explanatory diagram illustrating another display example (music reproduction screen 42) of an application screen that is displayed on the operation plane 30. As illustrated in FIG. 9, the music reproduction screen 42 is a screen that displays a bar 420*a* and a time pattern 420*b* of music that is being reproduced, a tempo 422, and the like. Note that it is assumed that a value of the tempo has been set in advance by the user here.

When the music reproduction screen 42 is displayed, the output control unit 106 may cause the pen type input device 50 to vibrate on the basis of a value of the set tempo and changes in the bar and the time pattern of the reproduced music. Further, the output control unit 106 may cause the type of the vibration to change depending on the values of the bar and the time pattern. According to these control examples, it is possible to cause the pen type input device 50 to vibrate like a metronome. In addition, it is possible to allow the user to feel the music by the vibration.

(2-1-1-5. Indicated Target Specifying Unit 108)

The indicated target specifying unit 108 specifies an object as a target indicated by the user on the basis of a result of detecting a position at which the pen type input device 50 points on the operation plane 30, which has been acquired by the detection result acquisition unit 102. For example, the indicated target specifying unit 108 specifies, as the object of the target indicated by the user, an object that is being displayed at the position of the pen tip of the pen type input device 50 on the operation plane 30.

(2-1-1-6. Correlating Unit 110)

The correlating unit 110 correlates the object specified by the indicated target specifying unit 108 with the pen type input device 50 on the basis of a user's operation. When a mapping button (not illustrated) included in the pen type input device 50 is pressed by the user, when a result of speech recognition of the user's speech is determined to be valid, or the like, for example, the correlating unit 110 switches a normal mode to a mapping mode. Then, the correlating unit 110 correlates an operation unit, such as a slider 504, for example, which is touched in the mapping mode by the user from among a plurality of operation units included in the pen type input device 50 with the object specified by the indicated target specifying unit 108. This allows the user to correlate a desired operation unit included in the pen type input device 50 with a desired object that is being displayed on the operation plane 30.

In addition, the correlating unit 110 dissolves the correlation between the object and the pen type input device 50 on the basis of a user's operation in a state in which the object is correlated with the pen type input device 50. When the mapping button included in the pen type input device 50 is pressed again by the user, when a result of speech recognition of the user's speech is determined to be valid, or the like, for example, the correlating unit 110 dissolves the correlation between the object and the pen type input device 50. Then, the correlating unit 110 switches the mapping mode to the normal mode. According to the control example described above, it is possible to maintain the correspondence between the object and the pen type input device 50 without any change even if the position of the pen tip on the operation plane 30 deviates when the rotation operation of the pen type input device 50 is performed.

(2-1-1-7. Communication Unit 120)

The communication unit 120 transmits and receives information to and from another device that can communicate with the server 10. For example, the communication unit 120 transmits an application screen with updated display to the display unit 20 or the operation plane 30 in accordance with control by the output control unit 106. Also, the communication unit 120 receives a result of detecting a touch of the pen type input device 50 from the operation plane 30 and receives a captured image of the operation plane 30 from the camera 22.

(2-1-1-8. Storage Unit 122)

The storage unit 122 stores various types of data and various types of software. For example, the storage unit 122 temporarily stores information regarding correlation between the object and the pen type input device 50.

[2-1-2. Effects]

(2-1-2-1. Effect 1)

As described above with reference to FIG. 4 and the like, for example, the server 10-1 according to the first embodiment changes values of a plurality of parameters correlated with a plurality of GUIs that are being displayed on the operation plane 30 on the basis of a result of detecting a user's operation using the pen type input device 50 on the operation plane 30. Since the pen type input device 50 includes a plurality of types of sensors and a plurality of types of operation units, the user can set values of a plurality of types of parameters at the same time by using the pen type input device 50. Therefore, it is possible to improve efficiency of information inputs.

(2-1-2-2. Effect 2)

In addition, the server 10-1 according to the first embodiment can correlate in advance an image of a GUI with an operation unit and an operation method for changing a parameter correlated with the GUI from among the plurality of operation units of the pen type input device 50 on the basis of a user's operation. This allows the user to operate the pen type input device 50 by an operation method suited for the shape of the GUI, for example, and more intuitively input information.

2-2. Second Embodiment

Figure 10B:
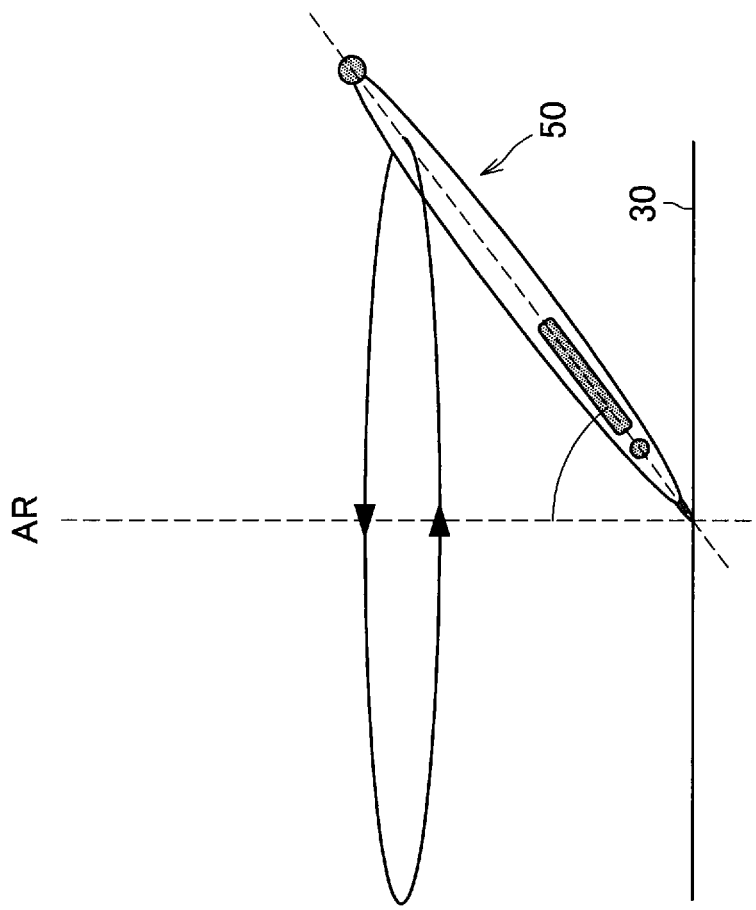
FIGS. 10(A) and 10(B) are explanatory diagrams illustrating a problem of a second embodiment.
Figure 10A:
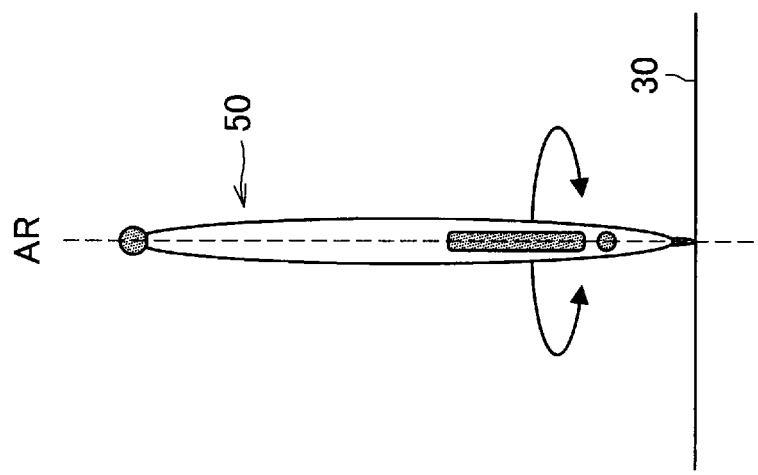

The first embodiment has been described above. Next, a second embodiment will be described. First, a background of creation of the second embodiment will be described with reference to FIGS. 10(A) and 10(B). FIGS. 10(A) and 10(B) are explanatory diagrams illustrating examples of two types of rotation operations of the pen type input device 50.

A rotation operation of the pen type input device 50 about a center axis as illustrated in FIG. 10(A), that is, a rotation operation in which the center axis of the pen type input device 50 coincides with a rotation axis AR has a problem that it is difficult for the user to turn the pen type input device 50. For example, it is difficult for the user to rotate the pen type input device 50 360 degrees or more without changing her or his grip of the pen type input device 50 in such a rotation operation.

Meanwhile, the user can easily rotate the pen type input device 50 about the rotation axis AR in the rotation operation of the pen type input device 50 in a state in which the pen type input device 50 is inclined with respect to the rotation axis AR as illustrated in FIG. 10(B). For example, the user can rotate the pen type input device 50 on the operation plane 30 a plurality of times without changing her or his grip on the pen type input device 50.

As will be described later, the server 10-2 according to the second embodiment can execute predetermined processing on the basis of a result of detecting the rotation operation of the pen type input device 50 in a state in which the pen type input device 50 is inclined with respect to the rotation axis.

[2-2-1. Configuration]

Next, a configuration of the server 10-2 according to the second embodiment will be described in detail. Note that description of content that overlaps the content of the first embodiment will be omitted below.

Figure 11:
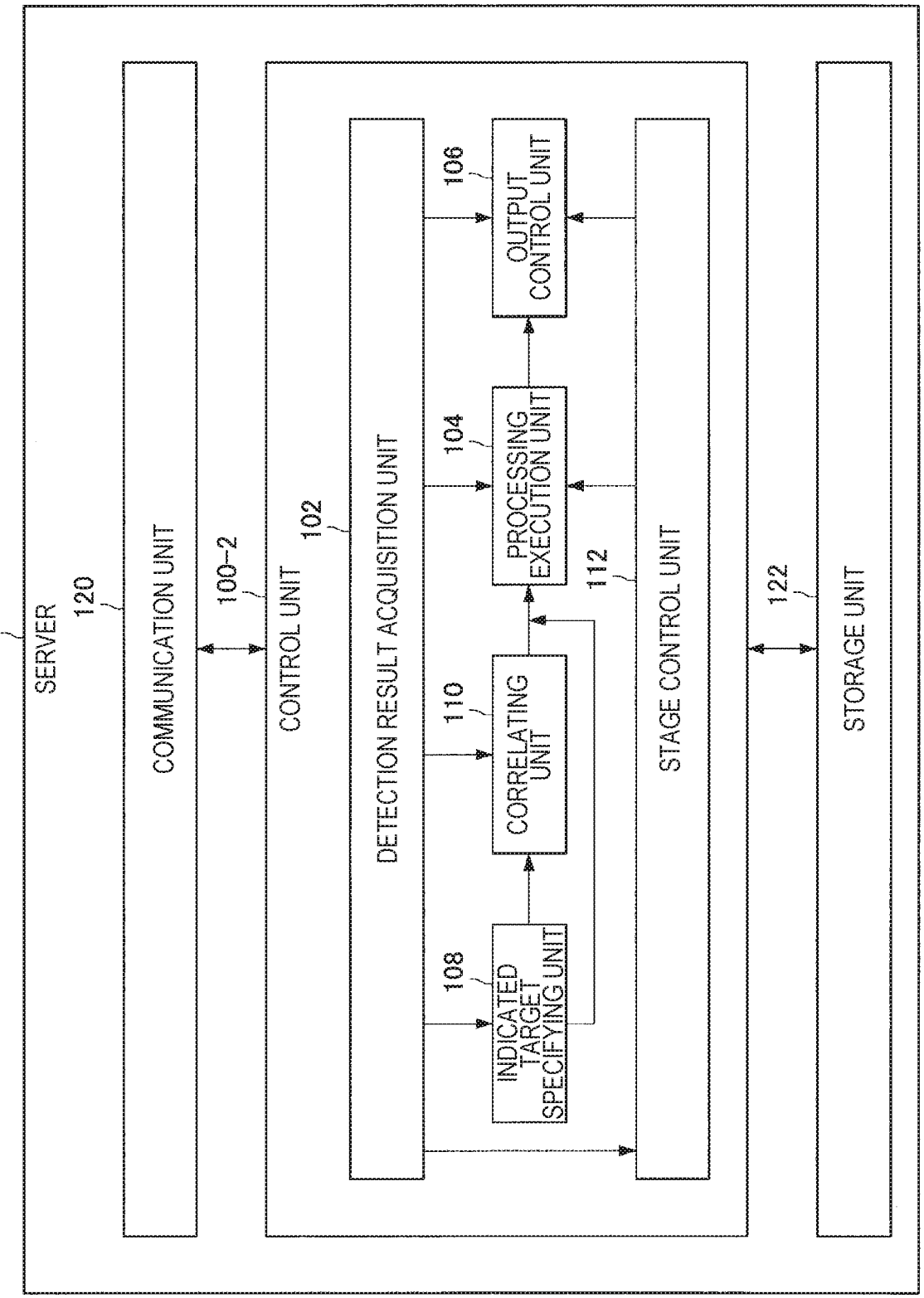
FIG. 11 is a functional block diagram illustrating a configuration example of a server 10-2 according to the second embodiment.

FIG. 11 is a functional block diagram illustrating the configuration of the server 10-2 according to the second embodiment. As illustrated in FIG. 11, the server 10-2 includes a control unit 100-2 instead of the control unit 100-1.

(2-2-1-1. Control Unit 100-2)

The control unit 100-2 further includes a stage control unit 112 as compared with the control unit 100-1.

(2-2-1-2. Detection Result Acquisition Unit 102)

The detection result acquisition unit 102 according to the second embodiment switches on and off a state in the rotation operation mode that is a mode for recognizing the rotation operation of the pen type input device 50 between ON and OFF on the basis of a user's operation using the pen type input device 50.

In a case in which it is detected that the pen type input device 50 has been rotated once, in a case in which it is detected that the rotation of the pen type input device 50 has been started in a state in which the pen type input device 50 is inclined by an angle that is equal to or greater than a predetermined threshold value, or in a case in which it is detected that the pen type input device 50 has suddenly been inclined, that is, it is detected that the pen type input device 50 has been inclined by an angle that is equal to or greater than a predetermined angle in a predetermined time, for example, the detection result acquisition unit 102 sets the rotation operation mode to ON. In addition, in a case in which it is detected that the pen tip of the pen type input device 50 has been removed from the operation plane 30 or in a case in which it is detected that the rotation of the pen type input device 50 has been stopped for a predetermined time or longer, the detection result acquisition unit 102 sets the rotation operation mode to OFF.

Alternatively, the detection result acquisition unit 102 may set the rotation operation mode to ON while it is detected that the button 502 is being pressed with a finger and set the rotation operation mode to OFF in a case in which it is detected that the finger has been removed from the button 502. Alternatively, the detection result acquisition unit 102 may shift the rotation operation mode between ON and OFF every time the button 502 is pressed with a finger.

Alternatively, the detection result acquisition unit 102 may set the rotation operation mode to ON in a case in which it is detected that the writing pressure of the pen type input device 50 has been raised to a predetermined value or higher and set the rotation operation mode to OFF in a case in which it is detected that the writing pressure has been raised again to the predetermined value or higher.

Alternatively, in a case in which the pen type input device 50 includes a predetermined touch sensor (not illustrated), the detection result acquisition unit 102 may switch the rotation operation mode between ON and OFF every time it is detected that the predetermined touch sensor has been tapped twice. Alternatively, the detection result acquisition unit 102 may set the rotation operation mode to ON in a case in which it is detected that the predetermined touch sensor has been tapped twice and set the rotation operation mode to OFF in a case in which it is detected that the predetermined touch sensor has been tapped three times.

Note that the detection result acquisition unit 102 can also switch the rotation operation mode between ON and OFF on the basis of a user's operation other than the operation on the pen type input device 50 instead of or in addition to the operation on the pen type input device 50. For example, the detection result acquisition unit 102 may switch the rotation operation mode between ON and OFF on the basis of a user's operation performed on a GUI switch that is being displayed on the operation plane 30. Alternatively, the detection result acquisition unit 102 may switch the rotation operation mode between ON and OFF on the basis of a user's operation performed on some hardware switch. Alternatively, the detection result acquisition unit 102 may switch the rotation operation mode between ON and OFF on the basis of a touch gesture performed by the user on the operation plane 30. Alternatively, the detection result acquisition unit 102 may switch the rotation operation mode between ON and OFF on the basis of comparison between a result of speech recognition of the user's speech and a predetermined character sequence (command). For example, the detection result acquisition unit 102 may set the rotation operation mode to ON only while it is determined that the result of the speech recognition of the user's speech, such as "round and round," is valid.

(2-2-1-3. Processing Execution Unit 104)

The processing execution unit 104 according to the second embodiment executes predetermined processing on the basis of a result of detecting the rotation operation of moving the pen type input device 50 such that the second portion of the pen type input device 50 draws a track about the rotation axis with a larger rotation radius than the first portion, which is determined to be in contact with or approaching an operation plane 30, of the pen type input device 50 in a case in which the rotation operation mode is set to ON. This rotation operation is a rotation operation of the pen type input device 50 about the rotation axis in a state in which the pen type input device 50 is inclined with respect to the rotation axis, for example. Alternatively, the processing execution unit 104 can also execute predetermined processing on the basis of a result of detecting a rotation operation of rotating the pen type input device 50 about a straight line, which passes through the pen tip (end portion) of the pen type input device 50 that is in contact with or approaching the operation plane 30 and passes through the operation plane 30, around the pen tip of the pen type input device 50 as a support point in a state in which the pen type input device 50 is inclined with respect to the straight line in a case in which the rotation operation mode is set to ON.

For example, the processing execution unit 104 executes processing of changing first information related to an object that is correlated in advance by the correlating unit 110 on the basis of the direction and the amount of the rotation of the pen type input device 50 about the rotation axis on the operation plane 30 and processing of changing second information related to the object on the basis of the amount of a change in the inclination of the pen type input device 50 with respect to the rotation axis.

Figure 12A:
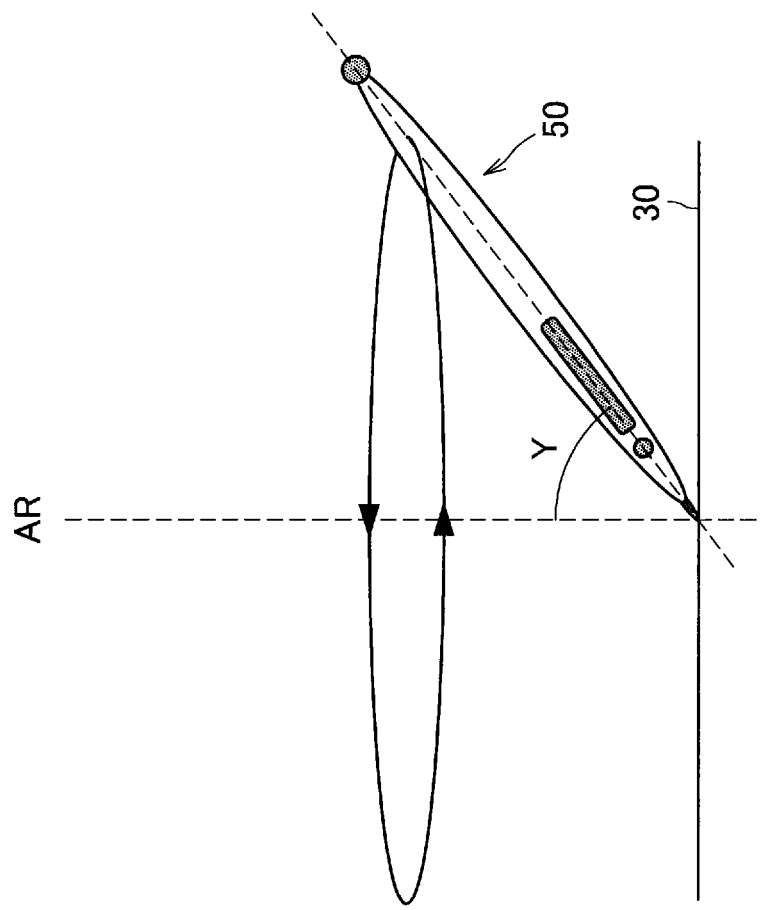
FIGS. 12(A) and 12(B) are explanatory diagrams illustrating an example of a rotation operation of the pen type input device 50 in a state in which the pen type input device 50 is inclined with respect to a rotation axis.
Figure 12B:
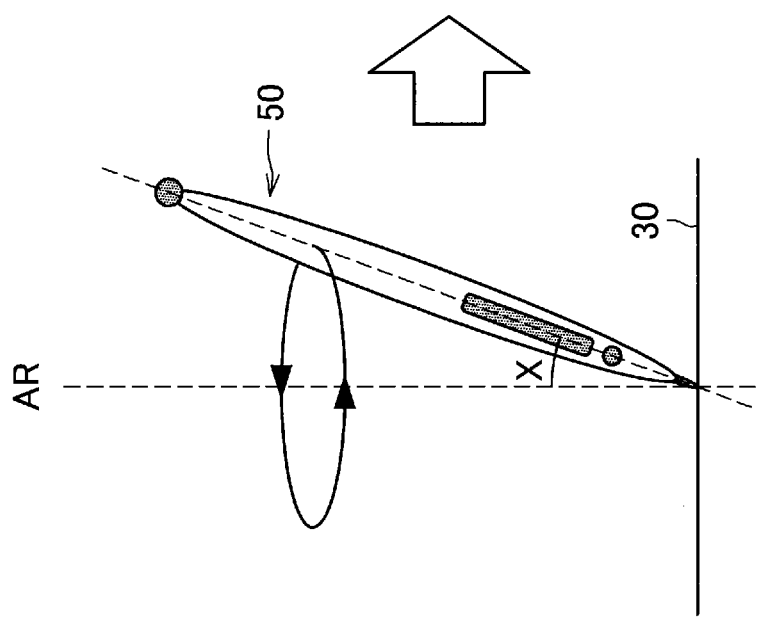

As one example, the processing execution unit 104 sequentially increase or decrease the first information related to the object as the amount of detected rotation increases in a case in which the rotation operation mode is set to ON and the rotation operation of the pen type input device 50 in the state in which the pen type input device 50 is inclined with respect to the rotation axis is detected. In addition, the processing execution unit 104 increases or decreases the second information related to the object on the basis of the detected amount of a change in the inclination in a case in which it is detected that the inclination of the pen type input device 50 with respect to the rotation axis AR has increased during the rotation of the pen type input device 50 as illustrated in FIGS. 12(A) and 12(B), for example.

Here, the first information is a predetermined parameter related to display of the correlated object, and the second information is a rate of a change in the predetermined parameter, for example. For example, the first information may be a size of the object, an effect such as zooming, scrolling, rotation, transmittance, or an amount of defocusing of display information inside the object, or the like. Note that the processing execution unit 104 may increase or decrease the second information, that is, the rate of a change in the predetermined parameter in a case in which it is detected that the inclination of the pen type input device 50 with respect to the rotation axis has increased.

Alternatively, the first information may be a first parameter related to the display of the correlated object, and the second information may be a second parameter related to the display of the object. For example, the combination of the first information and the second information may be a size and a color of the object, may be a size and an angle of the object, may be a size and an effect (that successively changes) of the object, may be a size of and an effect (that discretely changes) of the object, may be zooming of the information inside the object and an angle of the information inside the object, may be a size and flatness of the object, or may be transmittance and an amount of defocusing of the object. Alternatively, the first information and the second information may be arbitrary two elements from among a plurality of elements of a color space, such as a color phase and saturation of the object.

Note that the value of the second parameter may be divided into a plurality of stages in advance, and the degree of the inclination of the pen type input device 50 with respect to the rotation axis may be correlated in advance with a value of each stage of the second parameter. Then, the processing execution unit 104 can change the value of the second parameter by the amount of a change in the stage corresponding to the result of detecting a change in the inclination of the pen type input device 50 with respect to the rotation axis.

Also, the types of the first parameter and the second parameter described above may be able to be changed by the user. For example, it may be possible to change the type of each parameter by an operation performed on the pen type input device 50, such as pressing of the button 502, for example, or by an operation using another input device such as a mouse, for example.

Figure 13:
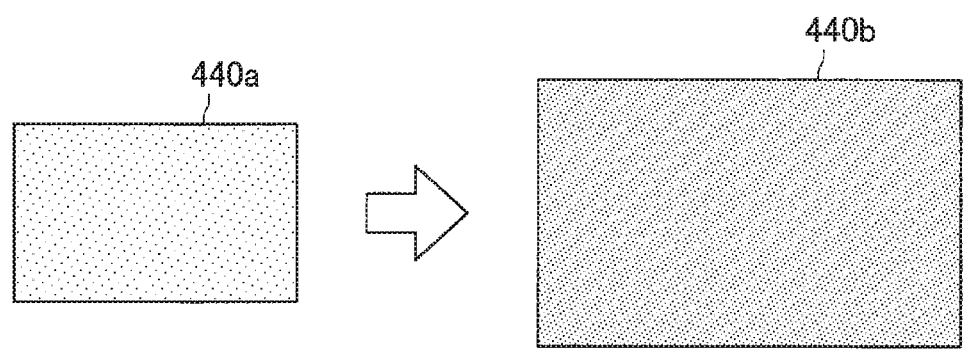
FIG. 13 is an explanatory diagram illustrating an example of a change in display of an object by the rotation operation of the pen type input device 50 according to the second embodiment.

Here, functions of the processing execution unit 104 described above will be described in more detail with reference to FIGS. 13 to 15. FIG. 13 is an explanatory diagram illustrating an example of processing that is executed by the processing execution unit 104 on an object 440a. Note that the object 440a is an object correlated with the pen type input device 50 and is an object in a state before the rotation operation of the pen type input device 50 is detected. Like an object 440b illustrated in FIG. 13, for example, the processing execution unit 104 enlarges the display size of the object 440 on the basis of a result of detecting the amount of rotation of the pen type input device 50 about the rotation axis and changes the display color of the object 440 on the basis of a result of detecting a change in the inclination of the pen type input device 50 with respect to the rotation axis.

Figure 14:
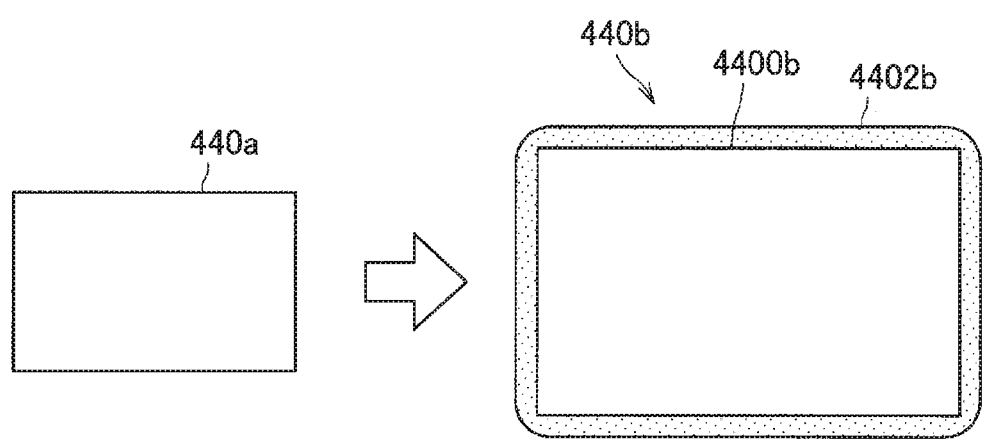
FIG. 14 is an explanatory diagram illustrating an example of a change in display of the object by the rotation operation of the pen type input device 50 according to the second embodiment.

In addition, FIG. 14 is an explanatory diagram illustrating another example of processing that is executed by the processing execution unit 104 on the object 440a illustrated in FIG. 13. For example, the processing execution unit 104 enlarges the display size of the object 440 like the object 440b illustrated in FIG. 14 on the basis of a result of detecting the amount of rotation of the pen type input device 50 about the rotation axis and displays an effect (of successive display) in an outer circumferential portion of the object 440 like an effect 4402b on the basis of a result of detecting a change in inclination of the pen type input device 50 with respect to the rotation axis.

Figure 15:
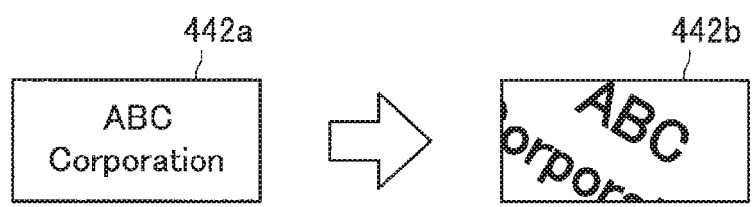
FIG. 15 is an explanatory diagram illustrating an example of a change in display of the object by the rotation operation of the pen type input device 50 according to the second embodiment.

In addition, FIG. 15 is an explanatory diagram illustrating an example of processing that is executed by the processing execution unit 104 on an object 442a. For example, the processing execution unit 104 zooms display information (characters) inside the object 442a on the basis of a result of detecting the amount of rotation of the pen type input device 50 about the rotation axis and changes an angle of the display information inside the object 442a on the basis of a result of detecting a change in inclination of the pen type input device 50 with respect to the rotation axis like an object 442b illustrated in FIG. 15.

Modification Example 1

Note that the processing execution unit 104 may change the type of the processing to be executed on the basis of a result of detecting a degree of inclination of the pen type input device 50 with respect to the rotation axis as a modification example. For example, the processing execution unit 104 may execute processing in a mode A in a case in which the inclination of the pen type input device 50 is equal to or greater than 60 degrees and execute processing in a mode B in a case in which the inclination of the pen type input device 50 is equal to or greater than 30 degrees and less than 60 degrees. Here, the processing in the mode A may be processing of zooming the display information inside the object on the basis of a result of detecting the amount of rotation of the pen type input device 50 about the rotation axis, and the processing in the mode B may be processing of rotating the object itself on the basis of a result of detecting the amount of rotation of the pen type input device 50 about the rotation axis, for example.

Modification Example 2

In addition, in a case in which it is detected that the pen type input device 50 has been rotated while an object that is being displayed on the operation plane 30 is moved by the user through drag and drop using the pen type input device 50, the processing execution unit 104 may enlarge the object, for example, while moving the object as another modification example.

Alternatively, in a case in which it is detected that the pen tip of the pen type input device 50 is made to slide on the operation plane 30 while the pen type input device 50 is rotated, the processing execution unit 104 may display a line of a track of the pen tip on the operation plane 30 while changing the color of the line in accordance with changes in the direction and the amount of the detected rotation. This makes it possible to display a line in a gradation form on the operation plane 30.

Modification Example 3

Figure 16:
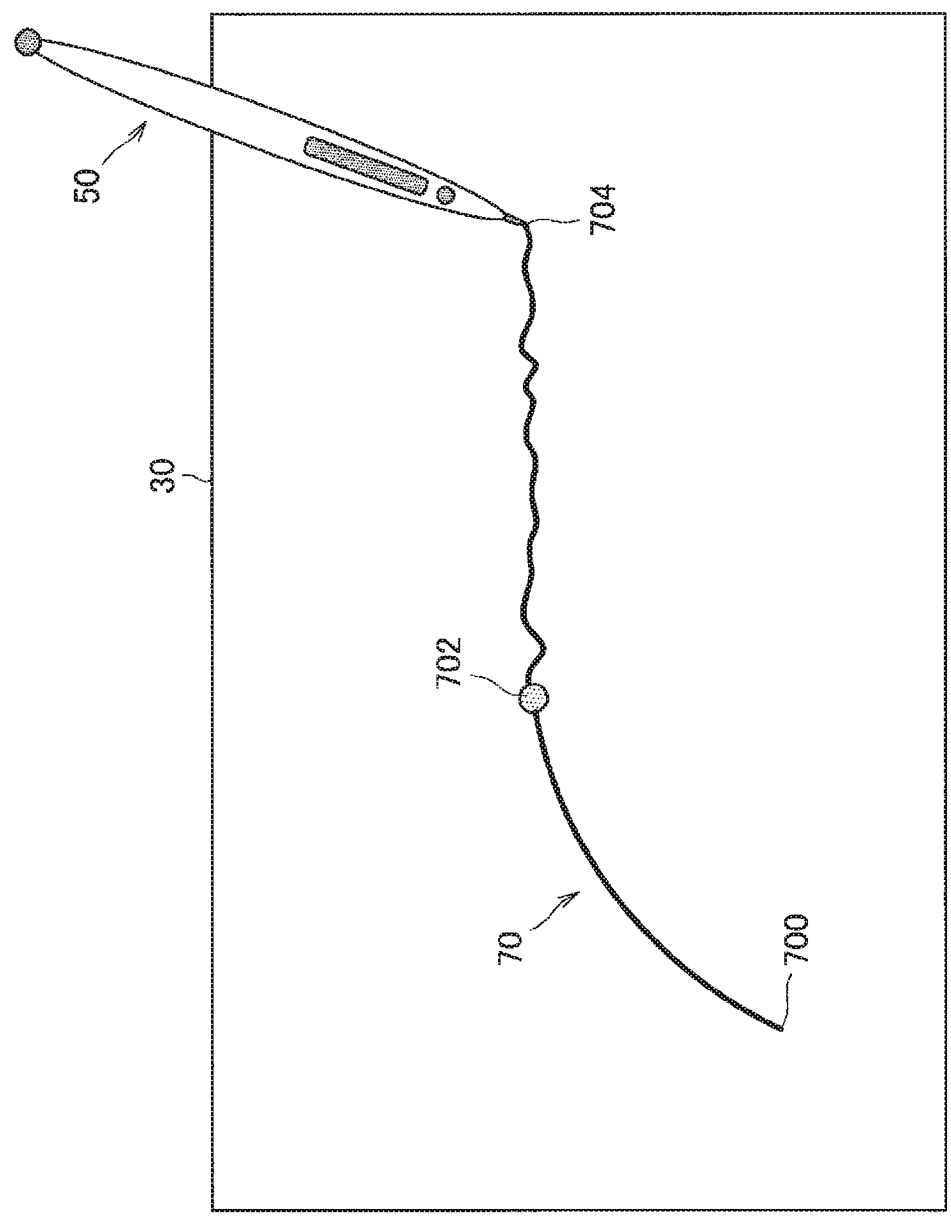
FIG. 16 is an explanatory diagram illustrating an example of display of a line drawn using the pen type input device 50.

In addition, the processing execution unit 104 can also perform control to guide the pen type input device 50 to position information of the pen tip of the pen type input device 50 on the operation plane 30 when the rotation operation mode is set to ON, which is stored in advance in the storage unit 122, as another modification example. Here, the function described above will be described in more detail with reference to FIG. 16. FIG. 16 is an explanatory diagram illustrating a display example of a drawn line 70 that is drawn by moving the pen tip of the pen type input device 50 from a start point 700 to an end point 704 on the operation plane 30. Note that the example illustrated in FIG. 16 assumes that the rotation operation mode is changed from OFF to ON at the position indicated by a circle 702.

For example, the processing execution unit 104 may display the position alone at which the rotation operation mode is changed to ON (that is, the position indicated by the circle 702) in an emphasized manner by turning on a light, changing the color, or the like, for example, on the drawn line 70. Alternatively, in a case in which the pen tip has been moved to the vicinity of the position at which the rotation operation mode is changed to ON after the pen tip of the pen type input device 50 is removed once from the operation plane 30, the processing execution unit 104 may vibrate the pen type input device 50. According to these control examples, it is possible to let the user know the position at which the rotation operation mode has been changed to ON after the operation of the pen type input device 50. As a result, the user can correct a result of the rotation operation of the pen type input device 50, such as a line that has already been drawn, for example. In the example illustrated in FIG. 16, for example, a part of the drawn line 70 between the position indicated by the circle 702 and the end point 704 gets distorted, and the user can correct the drawn line 70 by drawing the line again, or the like, for example, from the position indicated by the circle 702 as a start point in a case in which the user desires to correct this distortion.

Modification Example 4

Figure 17B:
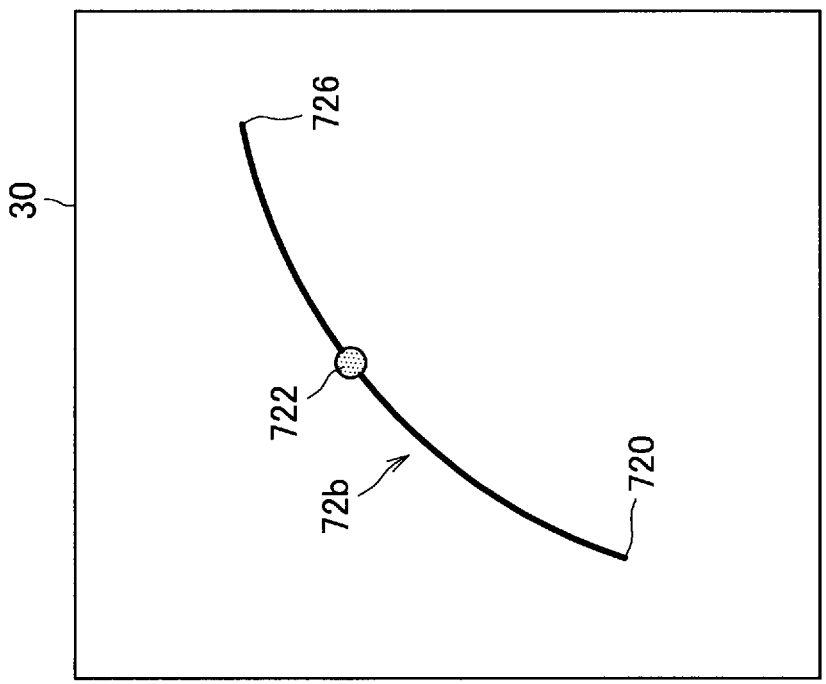
FIGS. 17(A) and 17(B) are explanatory diagrams illustrating a correction example of a line drawn using the pen type input device 50 according to the second embodiment.
Figure 17A:
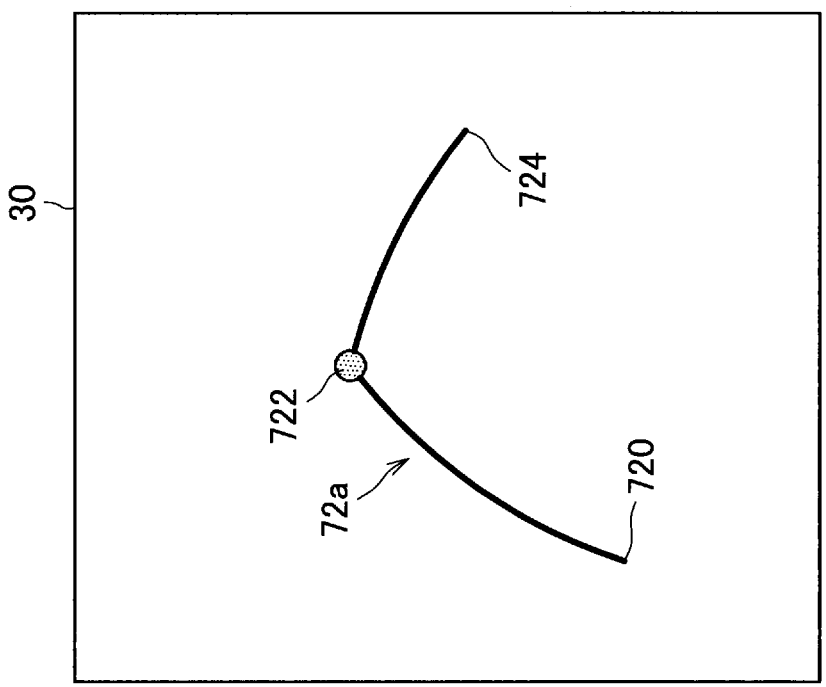

In addition, the processing execution unit 104 can also correct a drawn line by rotating a displayed image on the basis of position information about where the rotation operation mode has been set to ON, which is stored in the storage unit 122, as another modification example. Here, the function described above will be described in more detail with reference to FIGS. 17(A) and 17(B). Note that, FIG. 17(A) illustrates an example of a drawn line 72a that is drawn by moving the pen tip of the pen type input device 50 from a start point 720 to an end point 724. This drawn line 72a is bent at a position indicated by a circle 722.

In a case in which it is detected that an operation of continuing the drawn line 72 using the pen type input device 50, for example, has been performed in the state illustrated in of FIG. 17(A), the processing execution unit 104 rotates the image that is being displayed such that a track after the rotation operation continues to a track before the rotation operation on the basis of a position at which the rotation operation mode is changed to ON. This makes it possible to correct the drawn line 72 to continue like the drawn line 72b illustrated in FIG. 17(B).

(2-2-1-4. Output Control Unit 106)

Display Example 1

The output control unit 106 according to the second embodiment causes an object to be displayed in a display form according to a value of the first parameter and a value of the second parameter after change on the operation plane 30, for example, as illustrated in FIGS. 13 to 15 every time the value of the first parameter and the value of the second parameter related to the object that is being displayed on the operation plane 30 are changed by the processing execution unit 104.

Display Example 2

In addition, the output control unit 106 can cause display (hereinafter, also referred to as "display indicating that the rotation operation mode is being currently set") indicating that the rotation operation mode is ON to be displayed on the operation plane 30 on the basis of a setting state of the rotation operation mode. In a case in which the rotation operation mode is set to ON, for example, the output control unit 106 causes the display unit 20 to display the display indicating that the rotation operation mode is being currently set on the operation plane 30. In addition, in a case in which the rotation operation mode is set to OFF, the output control unit 106 causes the display unit 20 to end the display indicating that the rotation operation mode is being currently set.

Figure 18:
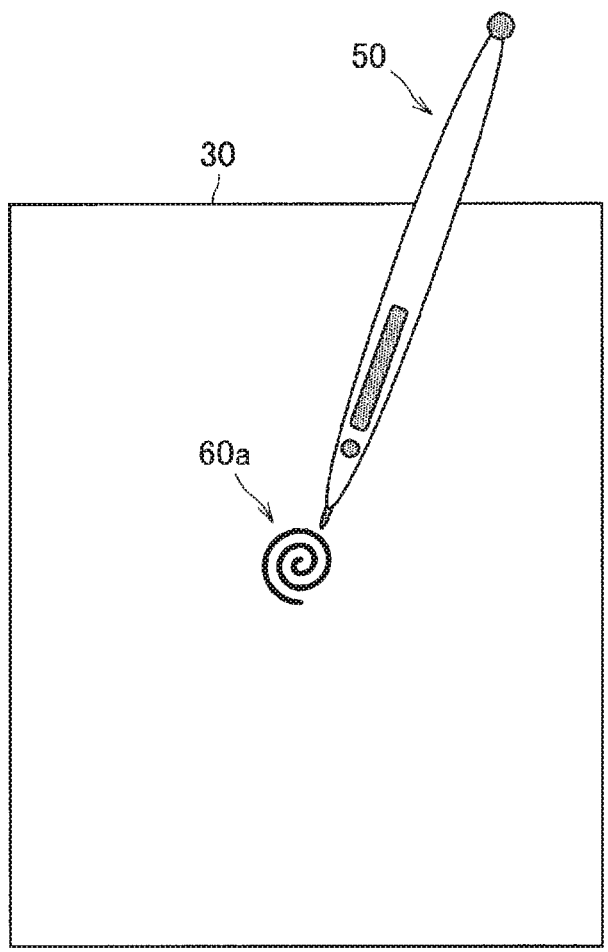
FIG. 18 is an explanatory diagram illustrating a display example of display in a rotation operation mode according to the second embodiment.

More specifically, the output control unit 106 causes the display indicating that the rotation operation mode is being currently set to be displayed at a position associated with a position at which the pen type input device 50 points on the operation plane 30. FIG. 18 is an explanatory diagram illustrating a display example of the display indicating that the rotation operation mode is being currently set (display 60a indicating that the rotation operation mode is being currently set). As illustrated in FIG. 18, the output control unit 106 causes the display 60a indicating that the rotation operation mode is being currently set to be displayed at the position of the pen tip of the pen type input device 50 on the operation plane 30, for example.

Display Example 3

Figure 19:
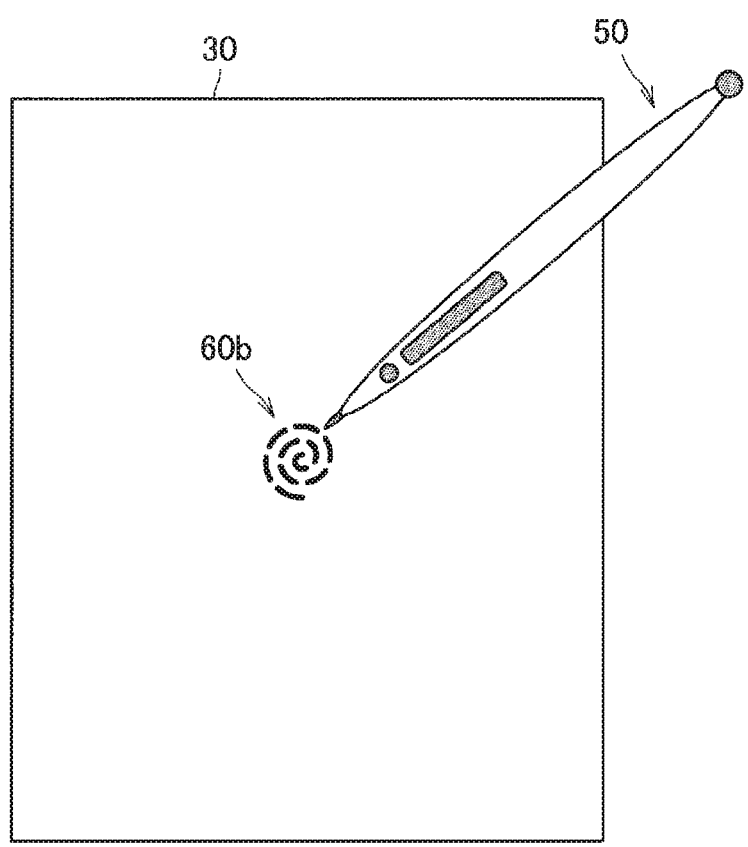
FIG. 19 is an explanatory diagram illustrating an example of an updated display form of display in the rotation operation mode depending on a change in a second parameter value according to the second embodiment.

In addition, the output control unit 106 can also cause the display form of the display indicating that the rotation operation mode is being currently set to change on the basis of the amount of a change in the second parameter every time the value of the second parameter is changed by the processing execution unit 104. FIG. 19 is an explanatory diagram illustrating an update example (display 60b indicating that the rotation operation mode is being currently set) of the display indicating that the rotation operation mode is being currently set in a case in which the inclination of the pen type input device 50 increases from the state illustrated in FIG. 18. In a case in which it is detected that the inclination of the pen type input device 50 has increased, the output control unit 106 causes, for example, the type of the color, the color strength, the shape, the size, the line type, the thickness of the line, or the like of the display 60 indicating that the rotation operation mode is being currently set to change in accordance with the amount of the detected change in the inclination and causes the display to be displayed on the operation plane 30, like the display 60b indicating that the rotation operation mode is being currently set illustrated in FIG. 19.

FIGS. 20(A) and 20(B) are explanatory diagrams illustrating another display example (display 62 indicating that the rotation operation mode is being currently set) of display indicating that the rotation operation mode is being currently set. Note that the display 62 indicating that the rotation operation mode is being currently set is display that is similar to the shape of a speed meter as illustrated in FIGS. 20(A) and 20(B).

As illustrated in FIG. 20(A), the output control unit 106 causes the display 62 indicating that the rotation operation mode is being currently set to be displayed on the operation plane 30 in a case in which the rotation operation mode is set to ON. Further, in a case in which it is detected that the inclination of the pen type input device 50 has increased from the state illustrated in FIG. 20(A), the output control unit 106 updates the display 62 indicating that the rotation operation mode is being currently set into the display form as if a measurement value of the speed meter increased and causes the display to be displayed on the operation plane 30 as illustrated in FIG. 20(B). According to these display examples, it is possible to let the user know the amount of a change in the second parameter.

Modification Example 1

Note that the output control unit 106 may cause the display indicating that the rotation operation mode is being currently set, which is being displayed, to rotate on the basis of a result of detecting the degree of the inclination of the pen type input device 50 as a modification example. For example, the output control unit 106 may increase the speed of the rotation of the display 60 indicating that the rotation operation mode is being currently set as the degree of the inclination of the pen type input device 50 increases and cause the display 60 indicating that the rotation operation mode is being currently set to be displayed.

Note that, in a case in which the display indicating that the rotation operation mode is being currently set has been rotated and the rotation operation mode has been changed from ON to OFF, the output control unit 106 may cause the display to be displayed such that the display indicating that the rotation operation mode is being currently set is continuously rotated for a specific time by inertia in accordance with a speed of the rotation at the time of the change. In the case described above, for example, the output control unit 106 may cause the display indicating that the rotation operation mode is being currently set to rotate while causing the speed of the rotation to gradually reduce from the speed of the rotation at the time of the change.

Modification Example 2

In addition, the output control unit 106 may cause display indicating the value of the second parameter as the display indicating that the rotation operation mode is being currently set to be displayed on the operation plane 30 as another modification example. For example, the output control unit 106 causes the value of the second parameter itself to be displayed on the operation plane 30 as the display indicating that the rotation operation mode is being currently set. Alternatively, the output control unit 106 may cause a stepwise display image indicating values (stages) of the second parameter to be displayed on the operation plane 30 as the display indicating that the rotation operation mode is being currently set. According to this display example, it is possible to let the user to know a current stage from among a plurality of stages set in advance.

Modification Example 3

In addition, the output control unit 106 may cause a speaker (not illustrated) to output sound indicating that the rotation operation mode is being currently set instead of or in addition to the display indicating that the rotation operation mode is being currently set in a case in which the rotation operation mode is set to ON as another modification example.

(2-2-1-5. Correlating Unit 110)

The correlating unit 110 according to the second embodiment can correlate an object specified by the indicated target specifying unit 108 with the pen type input device 50 on the basis of a setting state of the rotation operation mode. When the rotation operation mode is set to ON, for example, the correlating unit 110 correlates an object specified at the timing by the indicated target specifying unit 108 with the pen type input device 50. Also, when the rotation operation mode is set to OFF, the correlating unit 110 ends the correlation between the object and the pen type input device 50. According to this control example, it is possible to maintain the correspondence between the object and the pen type input device 50 without any change even if the position of the pen tip on the operation plane 30 is deviated during the rotation operation of the pen type input device 50.

(2-2-1-6. Stage Control Unit 112)

Setting Example 1

The stage control unit 112 is an example of the threshold value setting unit according to the present disclosure. The stage control unit 112 sets a threshold value of inclination of the pen type input device 50 when the second parameter changes to a previous stage or a next stage in accordance with a current stage of the second parameter in a case in which the value of the second parameter is divided into a plurality of stages. For example, the stage control unit 112 differentiates the threshold value of the inclination of the pen type input device 50 when the second parameter changes to a second stage in a case in which the current stage of the second parameter is a first stage from the threshold value of the inclination of the pen type input device 50 when the second parameter changes to the first stage in a case in which the current stage is the second stage.

Figure 21B:
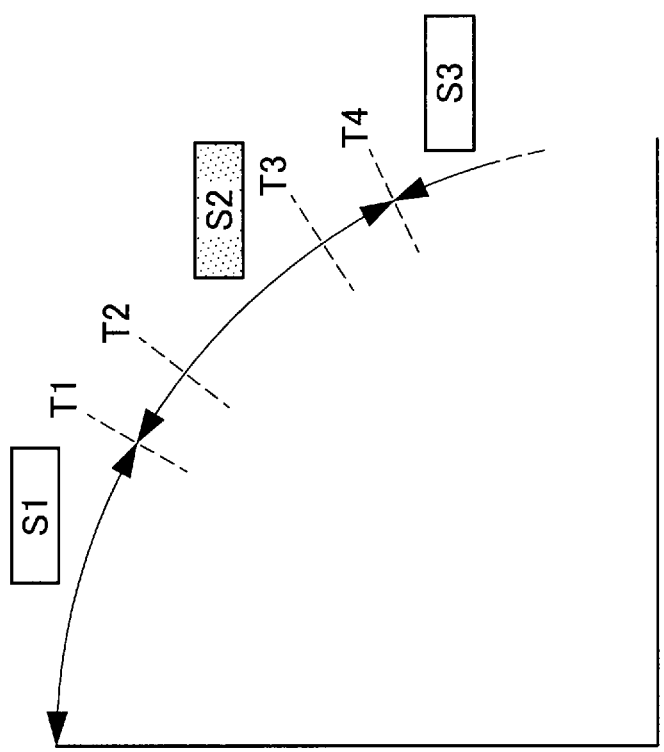
FIGS. 21(A) and 21(B) are explanatory diagrams illustrating a relation between each stage of a second parameter and a threshold value of a degree of inclination of the pen type input device 50.
Figure 21A:
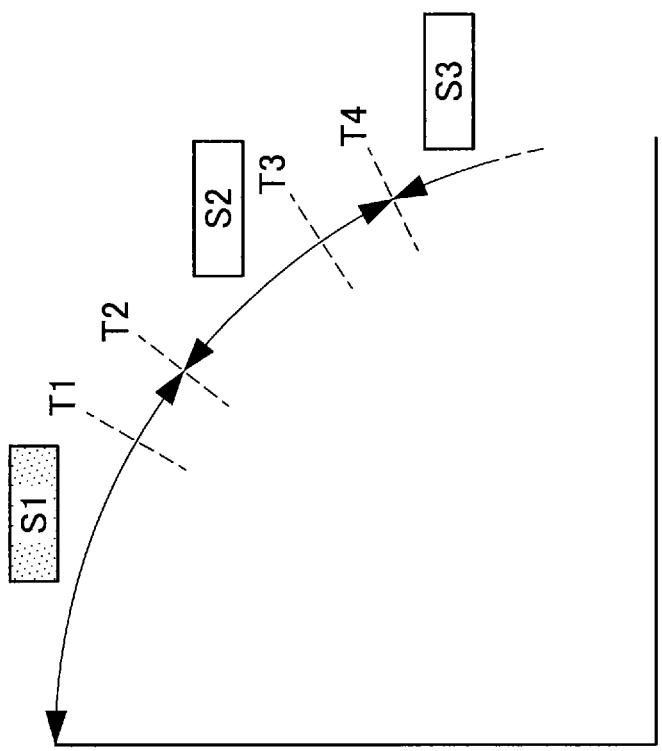

Here, the content of the above description will be described in more detail with reference to FIGS. 21(A) and 21(B). FIGS. 21(A) and 21(B) are explanatory diagrams illustrating a relation between each stage of the second parameter and a threshold value of a degree of inclination of the pen type input device 50. FIG. 21 illustrates a setting example of the threshold value of the degree of the inclination of the pen type input device 50 in a case in which the current stage of the second parameter is "S1". In addition, FIG. 21 illustrates a setting example of the threshold value of the degree of the inclination of the pen type input device 50 in a case in which the current stage of the second parameter is "S2" (that is a next stage of S1).

As illustrated in FIG. 21(A), the stage control unit 112 sets the threshold value of the inclination of the pen type input device 50 when the stage of the second parameter changes from "S1" to "S2" to "T2" in a case in which the current stage of the second stage is "S1". In addition, as illustrated in FIG. 21(B), the stage control unit 112 sets the threshold value of the inclination of the pen type input device 50 when the stage of the second parameter changes from "S2" to "S1" to "T1" (that satisfies T1<T2) in a case in which the current stage of the second parameter is "S2". In this manner, it is possible to prevent display of the object from frequently changing due to vibration of the inclination of the pen type input device 50 in the vicinity of the threshold value, which is caused by handshake or the like, for example, by providing hysteresis when the stage of the second parameter is changed. In addition, it is possible to prevent visibility from being degraded.

Setting Example 2

Further, the stage control unit 112 can also cause the threshold value of the inclination of the pen type input device 50 when the second parameter changes from the current stage to the previous stage and the next stage to dynamically change on the basis of a result of detecting a rotation operation of the pen type input device 50, which is acquired by the detection result acquisition unit 102. For example, the stage control unit 112 reduces the threshold value of the inclination of the pen type input device 50 when the second parameter changes from the current stage to the previous stage and increases the threshold value of the inclination of the pen type input device 50 when the second parameter changes from the current stage to the next stage as the speed of the rotation indicated by the result of detecting the rotation operation of the pen type input device 50 is higher.

Modification Example

Note that, although the example in which the stage control unit 112 causes the threshold value itself of the inclination of the pen type input device 50 when the stage of the second parameter changes has been described to change in the above description, the stage control unit 112 is not limited to such an example. For example, the stage control unit 112 may cause the stage of the second parameter to change on the basis of a length of a time during which the degree of the inclination of the pen type input device 50 exceeds the threshold value of the inclination in the previous stage or the next stage. As one example, the stage control unit 112 may cause the stage of the second parameter to change to the previous stage or the next stage only in a case where a continuous time during which the degree of the inclination of the pen type input device 50 exceeds the threshold value of the inclination in the previous stage or the next stage becomes a predetermined time or longer.

Note that functions of the other components are substantially similar to those in the first embodiment.

[2-2-2. Operation]

The configuration according to the second embodiment has been described above. Next, an operation according to the second embodiment will be described with reference to FIGS. 22 to 23.

Figure 22:
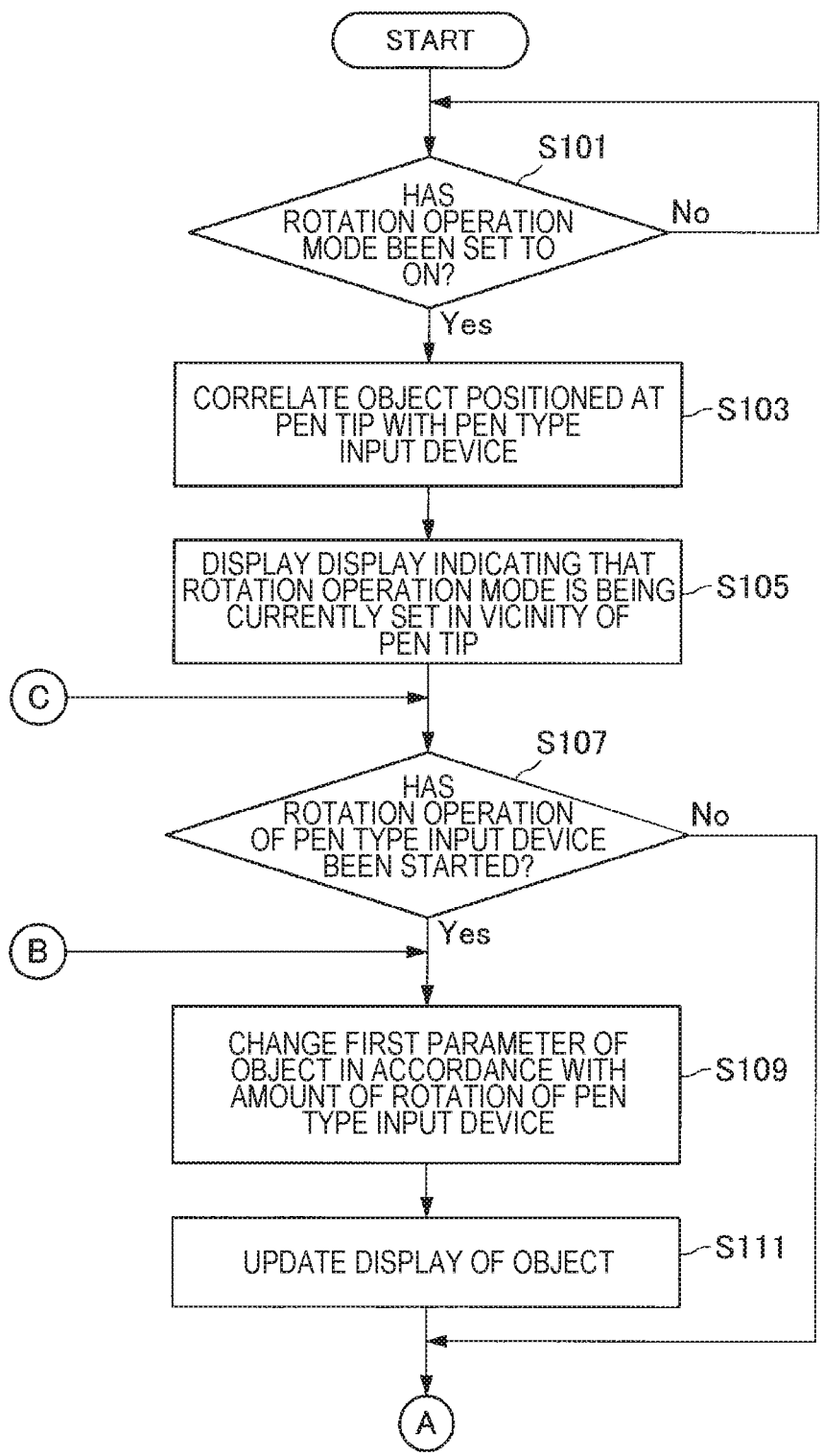
FIG. 22 is a flowchart illustrating a part of motion according to the second embodiment.

As illustrated in FIG. 22, first, the correlating unit 110 of the server 10 determines whether or not the rotation operation mode has been changed to ON (S101). In a case in which the rotation operation mode is OFF, the correlating unit 110 performs the operation in S101 again after elapse of a predetermined time, for example.

Meanwhile, in a case in which the rotation operation mode is changed to ON, the indicated target specifying unit 108 first specifies an object that is being displayed at the pen tip of the pen type input device 50 on the operation plane 30. Then, the correlating unit 110 correlates the object specified by the indicated target specifying unit 108 with the pen type input device 50 (S103).

Subsequently, the output control unit 106 causes the display indicating that the rotation operation mode is being currently set to be displayed in the vicinity of the position of the pen tip of the pen type input device 50 on the operation plane 30 (S105).

Subsequently, the processing execution unit 104 determines whether or not a result of detecting that a rotation operation of the pen type input device 50 has been started in a state in which the pen type input device 50 has been inclined with respect to the rotation axis has been acquired (S107). In a case in which the rotation operation of the pen type input device 50 has not been detected, the processing execution unit 104 performs an operation in S121, which will be described later.

Meanwhile, in a case in which the rotation operation of the pen type input device 50 has been detected, the processing execution unit 104 changes the value of the first parameter related to display of the object correlated in S103 in accordance with the amount of the detected rotation of the pen type input device 50 (S109). Then, the output control unit 106 updates a display form of the object in accordance with the value of the first parameter, which has been changed in S109, and causes the object to be displayed on the operation plane 30 (S111).

Figure 23:
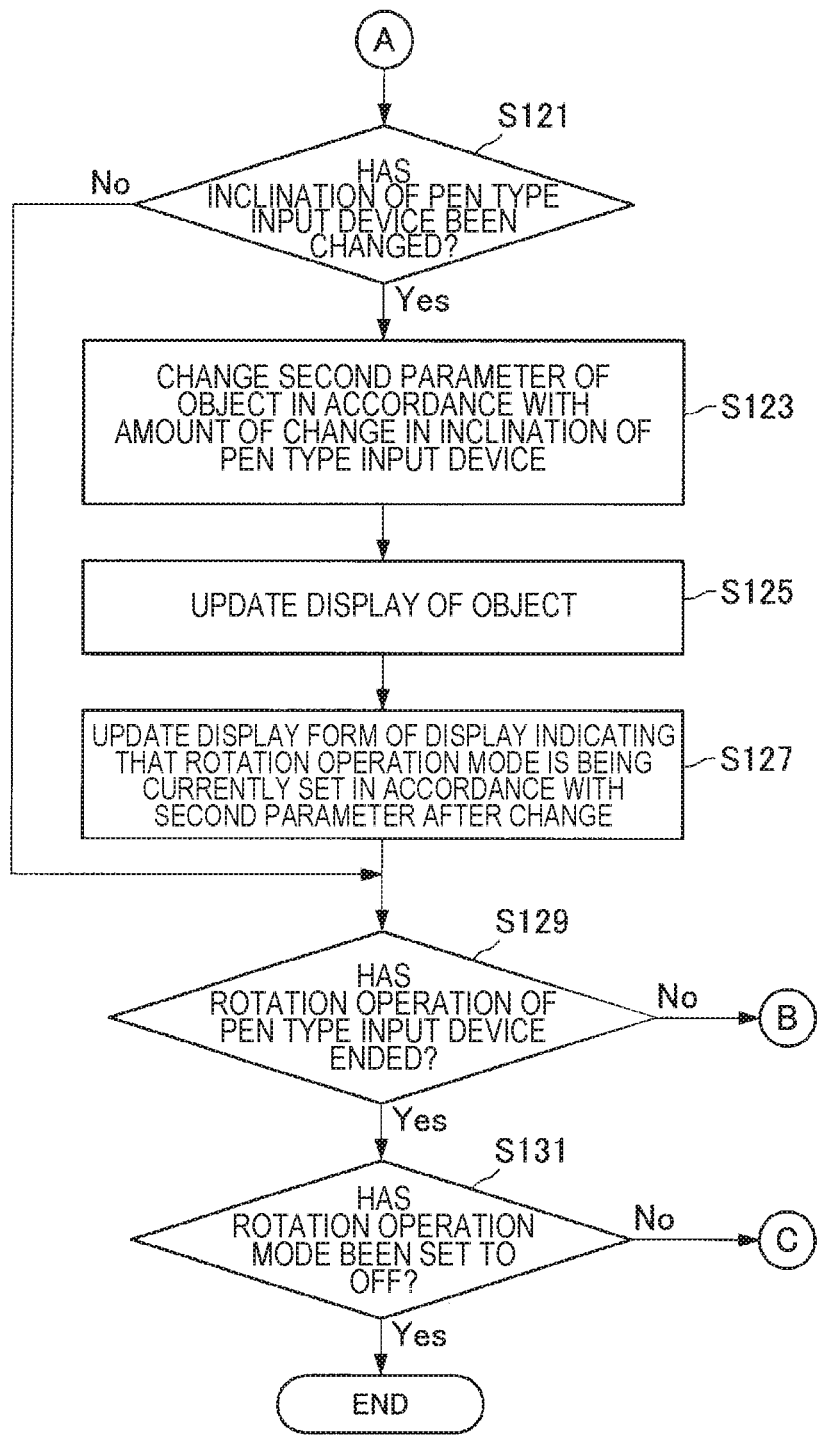
FIG. 23 is a flowchart illustrating a part of the motion according to the second embodiment.

Here, operations in steps after S111 will be described with reference to FIG. 23. As illustrated in FIG. 23, the processing execution unit 104 determines whether or not the degree of the inclination of the pen type input device 50 with respect to the rotation axis has been changed after S111 (S121). In a case in which no change in the inclination of the pen type input device 50 has been detected, the processing execution unit 104 performs an operation in S129, which will be described later.

Meanwhile, in a case in which a change in the inclination of the pen type input device 50 has been detected, the processing execution unit 104 changes the value of the second parameter related to the display of the object correlated in S103 in accordance with the amount of the detected change in the inclination of the pen type input device 50 (S123). Then, the output control unit 106 updates the display form of the object in accordance with the value of the second parameter which has been changed in S123 and causes the display to be displayed on the operation plane 30 (S125). Further, the output control unit 106 updates the display form of the display indicating that the rotation operation mode is being currently set in accordance with the value of the second parameter which has been changed in S123 and causes the display to be displayed on the operation plane 30 (S127).

Subsequently, the processing execution unit 104 determines whether or not a result of detecting that the rotation operation of the pen type input device 50 has been ended has been acquired (S129). In a case in which the end of the rotation operation of the pen type input device 50 has not been detected, the processing execution unit 104 performs the operation in S109 again.

Meanwhile, in a case in which the end of the rotation operation of the pen type input device 50 has been detected, the processing execution unit 104 determines whether or not the rotation operation mode has been changed to OFF (S131). In a case in which the rotation operation mode is maintained to be ON, the processing execution unit 104 performs the operation in S107 again. Meanwhile, in a case in which the rotation operation mode has been changed to OFF, the server 10-2 ends the present operation.

[2-2-3. Effects]

(2-2-3-1. Effect 1)

As described above with reference to FIGS. 11, and 22 to 23, for example, the server 10-2 according to the second embodiment executes predetermined processing on the basis of a result of detecting the rotation operation of the pen type input device 50 in a state in which the pen type input device 50 is inclined with respect to the rotation axis. For example, the server 10-2 changes the value of the first parameter related to the display of the object that is being displayed at the pen tip of the pen type input device 50 on the basis of a result of detecting the amount of rotation of the pen type input device 50 about the rotation axis and changes the value of the second parameter related to the display of the object on the basis of a result of detecting the amount of a change in the inclination of the pen type input device 50 with respect to the rotation axis.

Therefore, the user can change the two types of information related to the object at the same time by performing the rotation operation of the pen type input device 50 while pointing the object as a target of the operation from among one or more objects that are being displayed on the operation plane 30 using the pen type input device 50. Accordingly, it is possible to improve efficiency of inputting the information related to the object.

In addition, since the rotation operation described above is a rotation operation of the pen type input device 50 about the rotation axis in a state in which the pen type input device 50 is inclined with respect to the rotation axis, the user can easily rotate the pen type input device 50. For example, the user can rotate the pen type input device 50 on the operation plane 30 a plurality of times without changing her or his grip on the pen type input device 50.

(2-2-3-2. Effect 2)

In addition, the server 10-2 updates the display form of the object in accordance with the value of the first parameter and the value of the second parameter after the change every time the value of the first parameter and the value of the second parameter related to the object are changed, and displays the display on the operation plane 30. Therefore, the user can check the changes in the values of the parameters due to the rotation operation in real time during the rotation operation.

(2-2-3-3. Effect 3)

In addition, the server 10-2 displays the display indicating that the rotation operation mode is being currently set on the operation plane 30 in a case in which the rotation operation mode is changed to ON, and updates the display form of the display indicating that the rotation operation mode is being currently set in accordance with the value of the second parameter after the change every time the value of the second parameter of the object is changed and displays the display on the operation plane 30. Therefore, the user can know whether or not the rotation operation mode is being currently set to ON and how the current stage of the second parameter is, by viewing the operation plane 30.

3. HARDWARE CONFIGURATION

Figure 24:
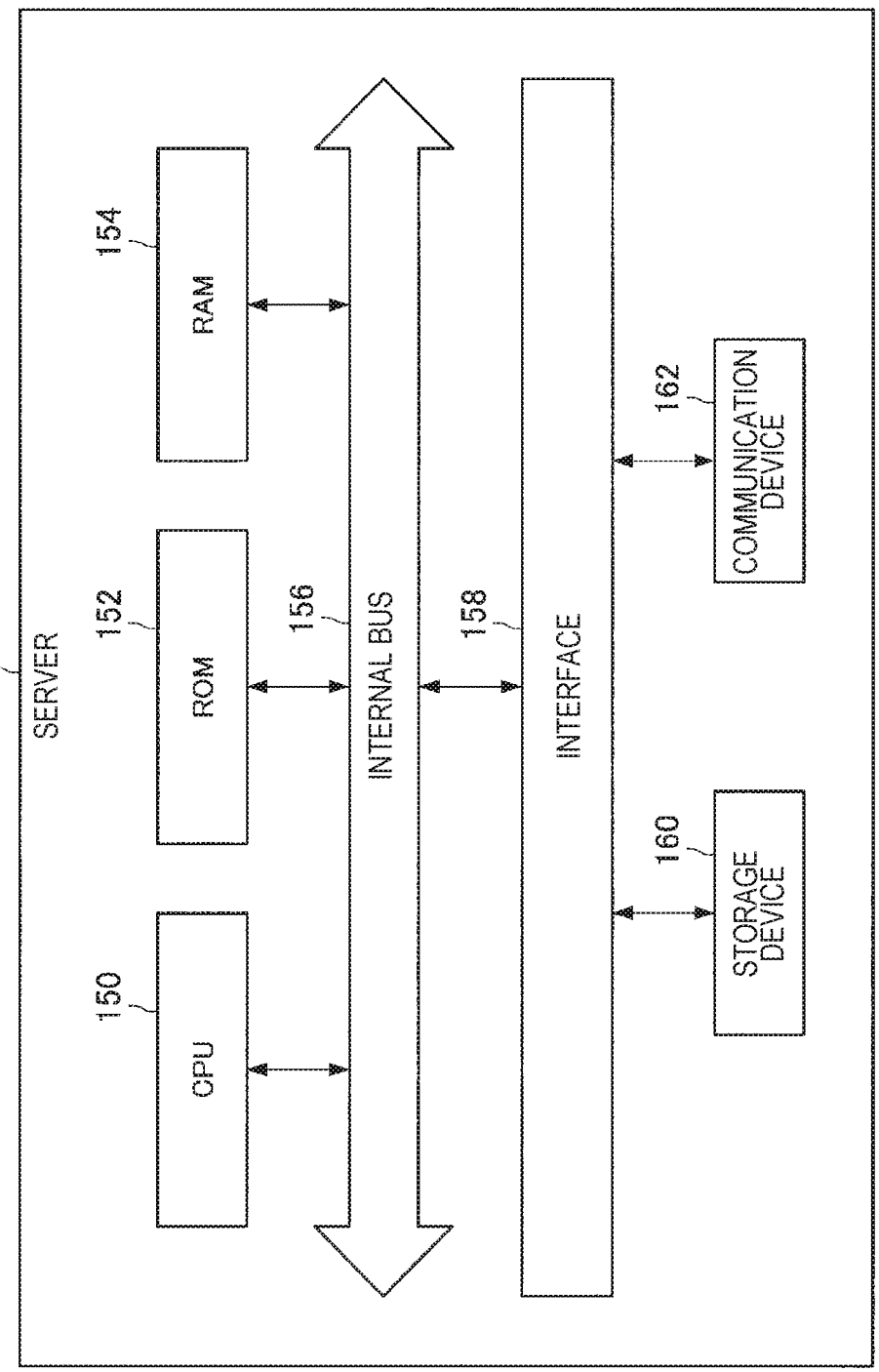
FIG. 24 is an explanatory diagram illustrating a hardware configuration of a server 10 that is common to the respective embodiments.

Next, a hardware configuration of the server 10 that is common to the respective embodiments will be described with reference to FIG. 24. As illustrated in FIG. 24, the server 10 includes a CPU 150, a read only memory (ROM) 152, a RAM 154, an internal bus 156, an interface 158, a storage device 160, and a communication device 162.

The CPU 150 functions as a computation processing device and a control device and controls overall operations inside the server 10 in accordance with various programs. In addition, the CPU 150 realizes functions of the control unit 100-1 or the control unit 100-2 in the server 10. Note that the CPU 150 includes a processor such as a microprocessor.

The ROM 152 stores control data and the like, such as programs and computation parameters that are used by the CPU 150.

The RAM 154 temporarily stores programs and the like that are executed by the CPU 150, for example.

The internal bus 156 includes a CPU bus or the like. The internal bus 156 connects the CPU 150, the ROM 152, and the RAM 154 with each other.

The interface 158 connects the storage device 160 and the communication device 162 with the internal bus 156. For example, the storage device 160 exchanges data with the CPU 150 via this interface 158 and the internal bus 156.

The storage device 160 is a device for storing data which functions as the storage unit 122. The storage device 160 includes, for example, a storage medium, a recording device that records data in the storage medium, a reading device that reads data from the storage medium, a deleting device that deletes data recorded in the storage medium, or the like.

The communication device 162 is a communication interface including a communication device or the like for connecting to the communication network such as a public network or the Internet, for example. In addition, the communication device 162 is a wireless LAN supporting communication device, a long term evolution supporting communication device, or a wired communication device that performs wired communication. This communication device 162 functions as the communication unit 120.

4. MODIFICATION EXAMPLES

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

4-1. Modification Example 1

For example, the application example in a scene in which an object such as a figure, for example, that is displayed on the operation plane 30 is edited is mainly described in the aforementioned second embodiment, the second embodiment is not limited to such an example. For example, the second embodiment can also be applied to a scene in which scrolling, zooming, page feeding, enlargement/size-reduction of characters that are being displayed, or the like is performed in software such as a web browser. In addition, the second embodiment can also be applied to a scene in which a color of a line, a thickness of the line, an effect, or the like, for example, in painting software is changed. In addition, the second embodiment can also be applied to a scene in which a game is operated, for example, such as changing a moving speed or a rotation speed of a character in a game or charging energy.

In addition, the second embodiment can also be applied to a scene in which information that is displayed on a display screen is operated, such as a scene in which the user changes the moving speed of an object that is being displayed on a display screen, zooming or enlarging is performed on displayed information, or motion of a game character that is being displayed is operated, for example, when the user wears a head mounted display (HMD). Note that a case is also assumed in which it is difficult to ground the pen tip of the pen type input device 50 on the operation plane 30 and to operate the pen type input device 50 when the HMD is worn. Thus, the server 10-2 may execute predetermined processing on the basis of a result of detecting a rotation operation of the pen type input device 50 in the air in a state in which the user is gripping the pen type input device 50 instead of the aforementioned "rotation operation of the pen type input device 50 in the state in which the pen type input device 50 is inclined with respect to the rotation axis" in the case in which the user wears the HIVID. For example, the server 10-2 may execute the processing of changing the second information related to the object that is correlated with the pen type input device 50 in advance on the basis of a result of detecting a size of a track (circle) of the pen type input device 50 in the air instead of the aforementioned "inclination of the pen type input device 50 with respect to the rotation axis".

4-2. Modification Example 2

Figure 25:
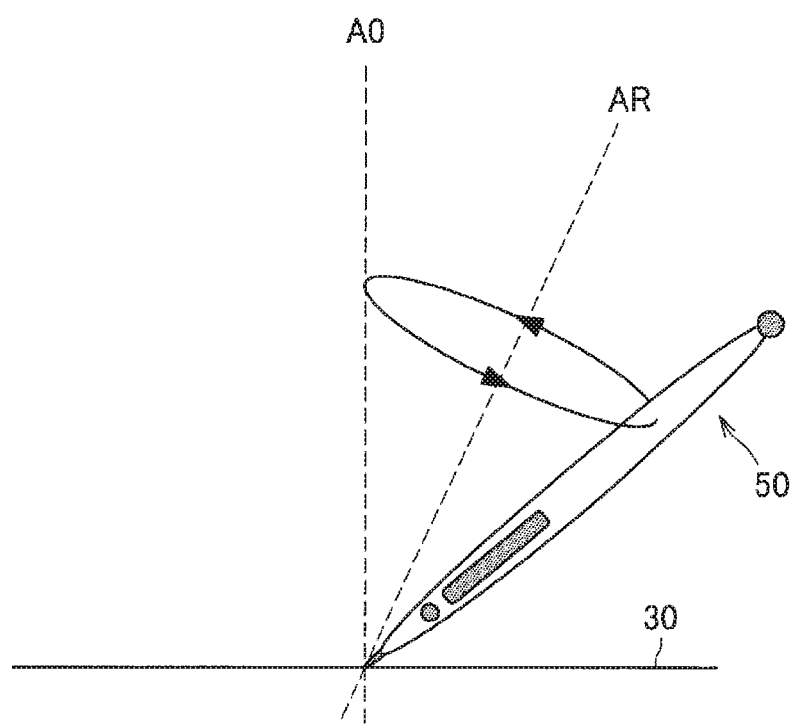
FIG. 25 is an explanatory diagram illustrating an example of the rotation operation of the pen type input device 50 in a case in which an angle of the rotation axis is an angle other than 90 degrees.

In addition, although the example in which the angle of the rotation axis of the pen type input device 50 with respect to the operation plane 30 is 90 degrees has been mainly described in the aforementioned second embodiment, the second embodiment is not limited to such an example. For example, the angle of the rotation axis of the pen type input device 50 with respect to the operation plane 30 may be an angle other than 90 degrees like the rotation axis AR illustrated in FIG. 25.

Further, the type of information that can be operated using the pen type input device 50 may be different depending on the angle of the rotation axis of the pen type input device 50 in this modification example 2. For example, the type of information that can be operated by the rotation operation of the pen type input device 50 may be different depending on how large the angle of the rotation axis is, for example, like the type of the information may be "R" in a case in which the angle of the rotation axis is equal to or greater than 60 degrees, the type of the information may be "G" in a case in which the angle is equal to or greater than 30 degrees and less than 60 degrees, the type of the information may be "B" in a case in which the angle is less than 30 degrees, and the like.

4-3. Modification Example 3

Figure 26A:
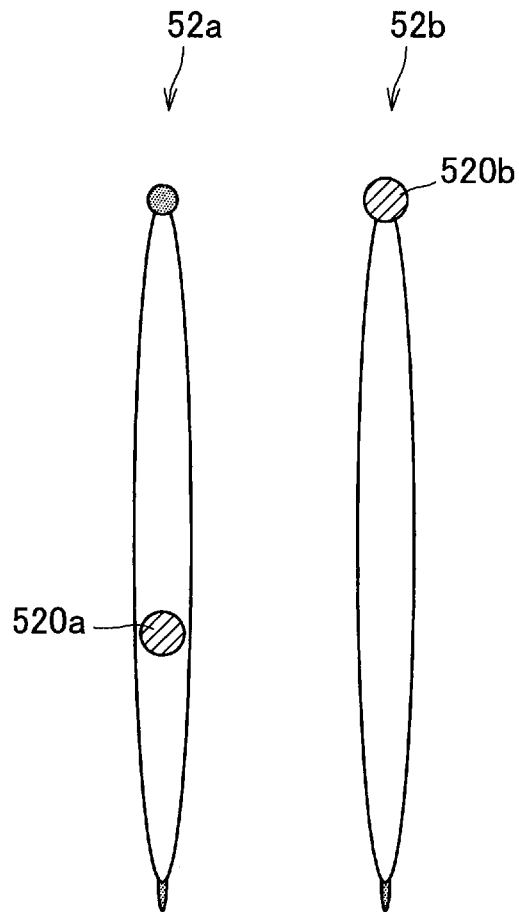
FIGS. 26(A) and 26(B) are explanatory diagrams illustrating an example of an appearance of a pen type input device according to a modification example of the present disclosure.
Figure 26B:
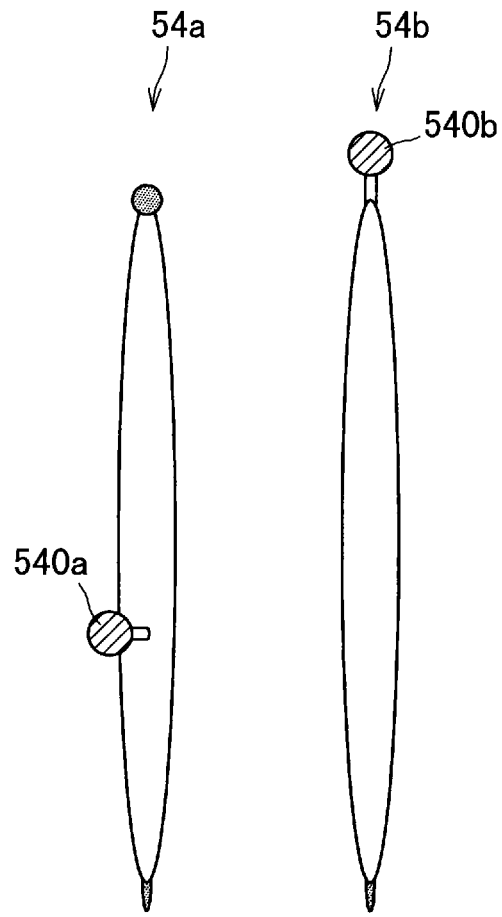

In addition, although the example in which the server 10-2 executes the predetermined processing on the basis of a result of detecting a rotation operation of the pen type input device 50 itself has been described in the aforementioned second embodiment, the second embodiment is not limited to such an example. For example, the server 10-2 can also (similarly) execute the predetermined processing on the basis of a result of detecting a user's rotation operation of an operation unit included in the pen type input device 50. As illustrated in FIG. 26(A), for example, the pen type input device 52 may include a trackball 520, and the server 10-2 may execute the predetermined processing on the basis of a result of detecting a user's rotation operation of the trackball 520. Alternatively, the pen type input device 54 may include a joystick 540, and the server 10-2 may execute the predetermined processing on the basis of a result of detecting a user's rotation operation of the joystick 540 as illustrated in FIG. 26(B).

4-4. Modification Example 4

In addition, although the example in which the operating body according to the present disclosure is the pen type input device 50 has been described in the aforementioned respective embodiments, the embodiments are not limited to such an example. For example, the operating body may be a finger of a hand of the user. Note that the server 10-2 may specify a rotation operation of the finger of the user by acquiring a measurement result of a wearable type computer such as a wrist watch type computer, for example, that the user wears or acquiring a captured image of the hand by the camera 22 in this modification example 4.

4-5. Modification Example 5

In addition, although the example in which the information processing apparatus according to the present disclosure is the server 10 has been described in the aforementioned respective embodiments, the respective embodiments are not limited to such an example. For example, the information processing apparatus may be a PC, a table type device, a smartphone, a tablet terminal, a game console, or the like.

4-6. Modification Example 6

In addition, according to the aforementioned respective embodiments, it is also possible to provide a computer program for causing the hardware such as the CPU 150, the ROM 152, and the RAM 154 to exhibit functions that are equivalent to those of the respective components in the server 10 according to the aforementioned respective embodiments. In addition, a recording medium having the computer program recorded thereon is also provided.

Additionally, the present technology may also be configured as below.

(1)

An information processing apparatus including:
a processing execution unit that executes predetermined processing on a basis of a result of detecting a rotation operation of moving an operation body to draw a track about a predetermined axis such that a second portion of the operating body, which is different from a first portion of the operating body that is determined to be in contact with or approaching an operation plane, has a larger rotation radius than a rotation radius of the first portion.

(2)

The information processing apparatus according to (1), in which the processing execution unit further executes the predetermined processing on a basis of a result of detecting a position at which the operating body points on the operation plane.

(3)

The information processing apparatus according to (2), in which the predetermined processing includes processing of changing first information related to an object that is being displayed at the position at which the operating body points on the operation plane, and
the processing execution unit changes the first information on a basis of an amount of rotation of the operating body about the predetermined axis.

(4)

The information processing apparatus according to (3), in which the rotation operation is a rotation operation of the operating body about the predetermined axis in a state in which the operating body is inclined with respect to the predetermined axis.

(5)

The information processing apparatus according to (4), in which the predetermined processing further includes processing of changing second information related to the object, and
the processing execution unit further changes the second information on a basis of an amount of a change in the inclination of the operating body with respect to the predetermined axis.

(6)

The information processing apparatus according to (5), in which the first information is a first parameter related to display of the object, and the second information is a change rate of the first parameter.

(7)

The information processing apparatus according to (5), in which the first information is a first parameter related to display of the object, and the second information is a second parameter related to the display of the object.

(8)

The information processing apparatus according to (7), in which the predetermined processing further includes processing of changing a third parameter related to the display of the object, and the processing execution unit executes the processing of changing the second parameter in a case in which a degree of inclination of the operating body with respect to the predetermined axis is within a first range and executes the processing of changing the third parameter in a case in which the degree of the inclination of the operating body with respect to the predetermined axis is within a second range that does not overlap the first range.

(9)

The information processing apparatus according to (7) or (8), in which a value of the second parameter is divided in advance into a plurality of stages, the degree of the inclination of the operating body with respect to the predetermined axis and values of the plurality of respective stages of the second parameter are correlated in advance, and the processing execution unit changes the second parameter by an amount of a change in a stage corresponding to an amount of a change in the inclination of the operating body with respect to the predetermined axis.

(10)

The information processing apparatus according to (9), in which a threshold value of the inclination of the operating body when the value of the second parameter changes from a first stage to a second stage is different from a threshold value of the inclination of the operating body when the value of the second parameter changes from the second stage to the first stage.

(11)

The information processing apparatus according to (10), further including:

a threshold value setting unit that dynamically changes the threshold value of the inclination of the operating body when the value of the second parameter changes from the first stage to the second stage on the basis of a rotation speed indicated by a result of detecting the rotation operation.

(12)

The information processing apparatus according to any one of (5) to (11), further including:

a display control unit that causes rotation operation detection display indicating that a rotation operation of the operating body is being detected to be displayed at a position associated with a position at which the operating body points on the operation plane.

(13)

The information processing apparatus according to (12), in which the display control unit causes a display form of the rotation operation detection display to change in accordance with an amount of a change in the second information based on the rotation operation.

(14)

The information processing apparatus according to (12) or (13), in which the display control unit causes the display of the rotation operation detection display to start in a case in which a detection mode of the rotation operation is started, and the display control unit causes the display of the rotation operation detection display to end in a case in which a detection mode of the rotation operation is ended.

(15)

The information processing apparatus according to any one of (1) to (14), in which a start and an end of a detection mode of the rotation operation are switched on a basis of a result of detecting a predetermined operation performed by a user.

(16)

The information processing apparatus according to (15), in which the detection mode of the rotation operation is started in a case in which the user has performed a first operation on the operating body, and the detection mode of the rotation operation is ended after the detection mode of the rotation operation is started and in a case in which the user has performed a second operation on the operating body.

(17)

The information processing apparatus according to (15) or (16), further including:

a correlating unit that correlates an object that is being displayed at a position at which the operating body points with the operating body when the detection mode of the rotation operation is started, in which the correlating unit ends a correlation between the object and the operating body when the detection mode of the rotation operation is ended.

(18)

The information processing apparatus according to any one of (1) to (17), in which the operating body is a pen type input device.

(19)

An information processing method including:

executing, by a processor, predetermined processing on a basis of a result of detecting a rotation operation of moving an operation body to draw a track about a predetermined axis such that a second portion of the operating body, which is different from a first portion of the operating body that is determined to be in contact with or approaching an operation plane, has a larger rotation radius than a rotation radius of the first portion.

(20)

A program that causes a computer to function as:

a processing execution unit that executes predetermined processing on a basis of a result of detecting a rotation operation of moving an operation body to draw a track about a predetermined axis such that a second portion of the operating body, which is different from a first portion of the operating body that is determined to be in contact with or approaching an operation plane, has a larger rotation radius than a rotation radius of the first portion.

REFERENCE SIGNS LIST

10-1, 10-2 server
20 display unit
22 camera
24 arm unit
26 display device
28 communication network
50, 52, 54 pen type input device
100-1, 100-2 control unit
102 detection result acquisition unit
104 processing execution unit
106 output control unit
108 indicated target specifying unit
110 correlating unit
112 stage control unit
120 communication unit
122 storage unit

The invention claimed is:

1. An information processing apparatus, comprising:
a processing execution unit configured to execute a determined process based on a result of a detection of a rotation operation of an operating body about a determined axis, wherein
the operating body is rotated to draw a track about the determined axis such that a second portion of the operating body has a rotation radius larger than a rotation radius of a first portion of the operating body,
the second portion of the operating body is different from the first portion of the operating body,
the first portion of the operating body is in contact with or approaches an operation plane on which a user input operation is received,
the determined process includes a first process to change first information related to an object based on an amount of the rotation operation of the operating body about the determined axis, and
the object is displayed at a position at which the operating body points on the operation plane.

2. The information processing apparatus according to claim 1, wherein
the processing execution unit is further configured to execute the determined process based on a result of a detection of the position at which the operating body points on the operation plane.

3. The information processing apparatus according to claim 1, wherein
the rotation operation is a rotation operation of the operating body about the determined axis in a state in which the operating body is inclined with respect to the determined axis.

4. The information processing apparatus according to claim 3, wherein
the determined process further includes a second process to change second information related to the object, and
the processing execution unit is further configured to change the second information based on an amount of a change in inclination of the operating body with respect to the determined axis.

5. The information processing apparatus according to claim 4, wherein
the first information is a first parameter related to display of the object, and
the second information is a change rate of the first parameter.

6. The information processing apparatus according to claim 4, wherein
the first information is a first parameter related to display of the object, and
the second information is a second parameter related to the display of the object.

7. The information processing apparatus according to claim 6, wherein
the determined process further includes a third process to change a third parameter related to the display of the object, and
the processing execution unit is further configured to:
change the second parameter based on a degree of inclination of the operating body with respect to the determined axis that is within a first range; and
change the third parameter based on the degree of inclination of the operating body that is within a second range, wherein the second range does not overlap the first range.

8. The information processing apparatus according to claim 6, wherein
a value of the second parameter is divided into a plurality of stages,
a degree of inclination of the operating body with respect to the determined axis and values of the plurality of stages of the second parameter are correlated, and
the processing execution unit is further configured to change the second parameter by an amount of a change in a stage corresponding to an amount of a change in the degree of inclination of the operating body with respect to the determined axis.

9. The information processing apparatus according to claim 8, wherein
a first threshold value of the degree of inclination of the operating body based on a change of the value of the second parameter from a first stage of the plurality of stages to a second stage of the plurality of stages is different from a second threshold value of the degree of inclination of the operating body based on a change of the value of the second parameter from the second stage to the first stage.

10. The information processing apparatus according to claim 9, further comprising
a threshold value setting unit configured to dynamically change the first threshold value of the degree of inclination of the operating body based on the change of the second parameter from the first stage to the second stage and based on a rotation speed of the operating body.

11. The information processing apparatus according to claim 4, further comprising
a display control unit configured to display a rotation operation detection display that indicates that the rotation operation of the operating body is detected to be displayed at a position associated with the position at which the operating body points on the operation plane.

12. The information processing apparatus according to claim 11, wherein
the display control unit is further configured to change a display form of the rotation operation detection display based on an amount of a change in the second information, and
the second information is changed based on the rotation operation.

13. The information processing apparatus according to claim 11, wherein the display control unit is further configured to:
start the display of the rotation operation detection display based on a start of a detection mode of the rotation operation; and
end the display of the rotation operation detection display based on an end of the detection mode of the rotation operation.

14. The information processing apparatus according to claim 1, wherein
a start of a detection mode of the rotation operation and an end of the detection mode of the rotation operation are switched based on a determined user operation.

15. The information processing apparatus according to claim 14, wherein
the detection mode of the rotation operation is started based on a first user operation on the operating body, and the detection mode of the rotation operation is ended after the detection mode of the rotation operation is started and based on a second user operation on the operating body.

16. The information processing apparatus according to claim 14, further comprising
a correlating unit configured to:
correlate the object displayed at the position at which the operating body points with the operating body based on the start of the detection mode of the rotation operation; and
end a correlation between the object and the operating body based on the end of the detection mode of the rotation operation.

17. The information processing apparatus according to claim 1,
wherein the operating body is a pen type input device.

18. An information processing method, comprising:
executing, by a processor, a determined process based on a result of a detection of a rotation operation of an operating body about a determined axis, wherein
the operating body is rotated to draw a track about the determined axis such that a second portion of the operating body has a rotation radius larger than a rotation radius of a first portion of the operating body,
the second portion of the operating body is different from the first portion of the operating body,
the first portion of the operating body is in contact with or approaches an operation plane on which a user input operation is received,
the determined process includes a process to change information related to an object based on an amount of the rotation operation of the operating body about the determined axis, and
the object is displayed at a position at which the operating body points on the operation plane.

19. A non-transitory computer-readable medium having stored thereon, computer-executable instructions which, when executed by a computer, cause the computer to execute operations, the operations comprising:
executing a determined process based on a result of a detection of a rotation operation of an operating body about a determined axis, wherein
the operating body is rotated to draw a track about the determined axis such that a second portion of the operating body has a rotation radius larger than a rotation radius of a first portion of the operating body,
the second portion of the operating body is different from the first portion of the operating body,
the first portion of the operating body is in contact with or approaches an operation plane on which a user input operation is received, and
the determined process includes a process to change information related to an object based on an amount of the rotation operation of the operating body about the determined axis, and
the object is displayed at a position at which the operating body points on the operation plane.

* * * * *